United States Patent
Nocon et al.

(10) Patent No.: US 10,921,596 B2
(45) Date of Patent: Feb. 16, 2021

(54) ADAPTIVE LUMINANCE/COLOR CORRECTION FOR DISPLAYS

(71) Applicant: Disney Enterprises, Inc., Burbank, CA (US)

(72) Inventors: Nathan Nocon, Valencia, CA (US); Michael P. Goslin, Burbank, CA (US); Wilfredo Rosas, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 85 days.

(21) Appl. No.: 16/043,431

(22) Filed: Jul. 24, 2018

(65) Prior Publication Data

US 2020/0033602 A1    Jan. 30, 2020

(51) Int. Cl.
| | |
|---|---|
| *G02B 27/01* | (2006.01) |
| *H04N 5/58* | (2006.01) |
| *H04N 9/77* | (2006.01) |
| *G06T 19/00* | (2011.01) |

(52) U.S. Cl.
CPC .......... *G02B 27/0172* (2013.01); *H04N 5/58* (2013.01); *H04N 9/77* (2013.01); *G02B 2027/0118* (2013.01); *G02B 2027/0174* (2013.01); *G02B 2027/0196* (2013.01); *G06T 19/006* (2013.01)

(58) Field of Classification Search
CPC .......... G09G 5/006; G09G 5/024; G09G 5/06; G09G 5/12; G09G 5/10
See application file for complete search history.

(56) References Cited

U.S. PATENT DOCUMENTS

| | | | | |
|---|---|---|---|---|
| 6,118,455 | A * | 9/2000 | Hidaka | G06T 11/001 345/589 |
| 6,618,045 | B1 * | 9/2003 | Lin | G09G 5/10 345/207 |
| 8,953,882 | B2 * | 2/2015 | Lim | H04N 17/002 348/241 |
| 9,075,781 | B2 * | 7/2015 | Matthews | G06F 11/2294 |
| 9,105,078 | B2 * | 8/2015 | Lim | G06T 5/001 |
| 9,131,196 | B2 * | 9/2015 | Lim | H04N 9/64 |
| 9,578,133 | B2 * | 2/2017 | Matthews | G06F 8/38 |

(Continued)

FOREIGN PATENT DOCUMENTS

EP    2662723    11/2013

*Primary Examiner* — Olga V Merkoulova
(74) *Attorney, Agent, or Firm* — Esplin & Associates, PC

(57) ABSTRACT

The systems described herein facilitate providing a virtual content with an intended appearance. The virtual content can be an interactive space. The interactive space may be presented on a display of a presentation device. The display can be a transparent display. The interactive space can be superimposed over a perspective of a physical real-world environment of a user. Environmental characteristics of the physical real-world environment can alter the intended appearance of the interactive space superimposed over a perspective of a physical real-world environment. The environmental characteristics include one or more of a light intensity, color, and/or other visual features of the physical real-world environment. The appearance of the interactive space can be altered to compensate for the environmental characteristics. The appearance of the interactive space can be altered such the user can perceive the interactive space as intended by the creator of the interactive space.

20 Claims, 10 Drawing Sheets

(56) References Cited

U.S. PATENT DOCUMENTS

| | | | |
|---|---|---|---|
| 9,836,109 B2* | 12/2017 | Lee | G09G 5/10 |
| 10,261,611 B2* | 4/2019 | Matthews | G06F 11/3041 |
| 10,275,892 B2* | 4/2019 | Bleibel | G06T 11/60 |
| 1,031,927 A1 | 6/2019 | Carter | |
| 10,319,272 B1* | 6/2019 | Carter | G06F 3/013 |
| 10,412,373 B2* | 9/2019 | Pitts | H04N 13/117 |
| 10,440,407 B2* | 10/2019 | Song | H04N 13/38 |
| 10,540,818 B2* | 1/2020 | Akeley | H04N 13/383 |
| 10,567,464 B2* | 2/2020 | Pang | H04N 19/44 |
| 10,679,361 B2* | 6/2020 | Karnad | G06T 7/251 |
| 2003/0234785 A1* | 12/2003 | Matsuda | H04N 5/74 |
| | | | 345/426 |
| 2007/0165048 A1* | 7/2007 | Yamashita | G06T 5/009 |
| | | | 345/601 |
| 2007/0296874 A1* | 12/2007 | Yoshimoto | G09G 3/003 |
| | | | 348/739 |
| 2008/0218501 A1* | 9/2008 | Diamond | G09G 3/22 |
| | | | 345/207 |
| 2009/0219442 A1* | 9/2009 | Hironaka | H04N 5/58 |
| | | | 348/687 |
| 2012/0242678 A1 | 9/2012 | Border | |
| 2016/0026253 A1* | 1/2016 | Bradski | G02B 27/225 |
| | | | 345/8 |

* cited by examiner

ADAPTIVE LUMINANCE/COLOR CORRECTION FOR DISPLAYS

FIELD OF THE DISCLOSURE

The present disclosure relates to providing interactive spaces including augmented reality with an intended appearance.

BACKGROUND

Augmented reality may be used to present virtual content to users. The virtual content may be generated through computing systems, presentation devices, and related peripherals.

SUMMARY

The systems described herein facilitate providing an interactive space with an intended appearance. The interactive space may be presented on a display (such as a transparent display) of a presentation device and/or other devices. A set of display values of visual parameters may define the appearance of the interactive space presented on the display of the presentation device. The interactive space may include one or more of an augmented reality environment, an augmented reality objects, and/or other content. The interactive space may be superimposed over a perspective of a physical real-world environment of a user. The interactive space presented by the presentation device may include a predetermined set of expected values of visual parameters and/or other information. The predetermined set of expected values of visual parameters may define an intended appearance of the interactive space. The physical real-world environment of the user may include one or more environmental characteristics. Different environmental characteristics may alter the appearance of the interactive space presented on the presentation device from the intended appearance. The set of display values of visual parameters may be altered such that the interactive space presented on the display of the presentation device appears as the intended appearance of the interactive space.

In some implementations, a system configured to facilitate providing an interactive space with an intended appearance may include one or more of one or more servers, one or more computing platforms, one or more presentation devices, one or more external resources, and/or other components. Users may access the system via the computing platforms and/or other devices. In some implementations, the server(s) may include one or more of electronic storages, one or more physical processors, and/or other components. In some implementations, the one or more physical processors may be configured by machine-readable instructions. Executing the machine-readable instructions may cause the one or more physical processors to facilitate providing the interactive space with the intended appearance. The machine-readable instructions may include one or more computer program components. The one or more computer program components may include one or more of a content component, a device component, an environment component, a determination component, a modification component, a presentation component, and/or other components.

The content component may be configured to obtain content information, reference information, and/or other information. The content information may define virtual content and/or other information. The virtual content may include the interactive space and/or other information. The virtual content may include the augmented reality environment, the augmented reality objects, and/or other virtual content. The reference information may define a set of expected values of visual parameters of the virtual content and/or other information. The set of expected values of the visual parameters may define an intended appearance of the visuals of the virtual content. The intended appearance of the visuals of the virtual content defined by the set of expected values of the visual parameters may be referred to as the expected virtual content from here on out. The expected virtual content may be predetermined by a user and/or creator of the virtual content. The set of expected values of the visual parameters may be specified for one or more individual pixels and/or a group of pixels. The visual parameters may include a brightness parameter, a contrast parameter, a color parameter, and/or other parameters.

The device component may be configured to obtain display information and/or other information. The display information may define the characteristics of a display of the computing platforms and/or other devices. The display information may define display values of the visual parameters of the virtual content presented on the computing platforms. The display information may define the display values of the visual parameters presented on the computing platform according to characteristics of the display of the computing platforms. The display values of the visual parameters define the virtual content perceived by the user. The set of display values of the visual parameters may be specified for one or more individual pixels and/or a group of pixels.

The environment component may be configured to obtain environmental information and/or other information. The environmental information may define the physical real-world environment of the user. The environmental information may define the environmental characteristics of the physical real-world environment of the user. The environmental characteristic may include characteristics of ambient light of the physical real-world environment of the user.

The determination component may be configured to obtain difference information and/or other information. The difference information may define difference values of the visual parameters. The difference values of the visual parameters may specify the differences between the display values and the expected values of the individual visual parameters. The determination component may be configured to determine the difference information and/or other information. The determination component may be configured to determine difference values of the visual parameters. The determination component may be configured to determine the difference values of the visual parameters by comparing the display values to the expected values of the individual visual parameters. The determination component may be configured to determine the difference values of the visual parameters by comparing the individual display values to the individual expected values of the individual visual parameters. The comparison of the display values and the expected values of the individual visual parameters may include a comparison between one or more individual pixels and/or groups of pixels.

The modification component may be configured to modify the display values of the visual parameters of the virtual content based on the modification information and/or other information. The modification component may be configured to modify the display values of the visual parameters of the virtual content to match the expected display values of the visual parameters of the virtual content such that the virtual content appears on the display of the computing platform as the expected virtual content and/or close to the expected virtual content. The modification component may be configured to modify the display values of the visual parameters of the virtual content based on the environmental characteristics of the physical real-world environment. The modification component may be configured to modify the display values of the visual parameters of the virtual content for one or more individual pixels and/or groups of pixels of the display of the computing platform.

The presentation component may be configured to facilitate the presentation of the virtual content and/or other information. The presentation component may be configured to facilitate the presentation of the virtual content on the display of the computing platform such that the virtual content appears on the display of the computing platform as the expected virtual content and/or close to the expected virtual content.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description and are not intended as a definition of the limits of the invention. As used in the specification and in the claims, the singular form of "a," "an," and "the" include plural referents unless the context clearly dictates otherwise.

DETAILED DESCRIPTION

Figure 1A:
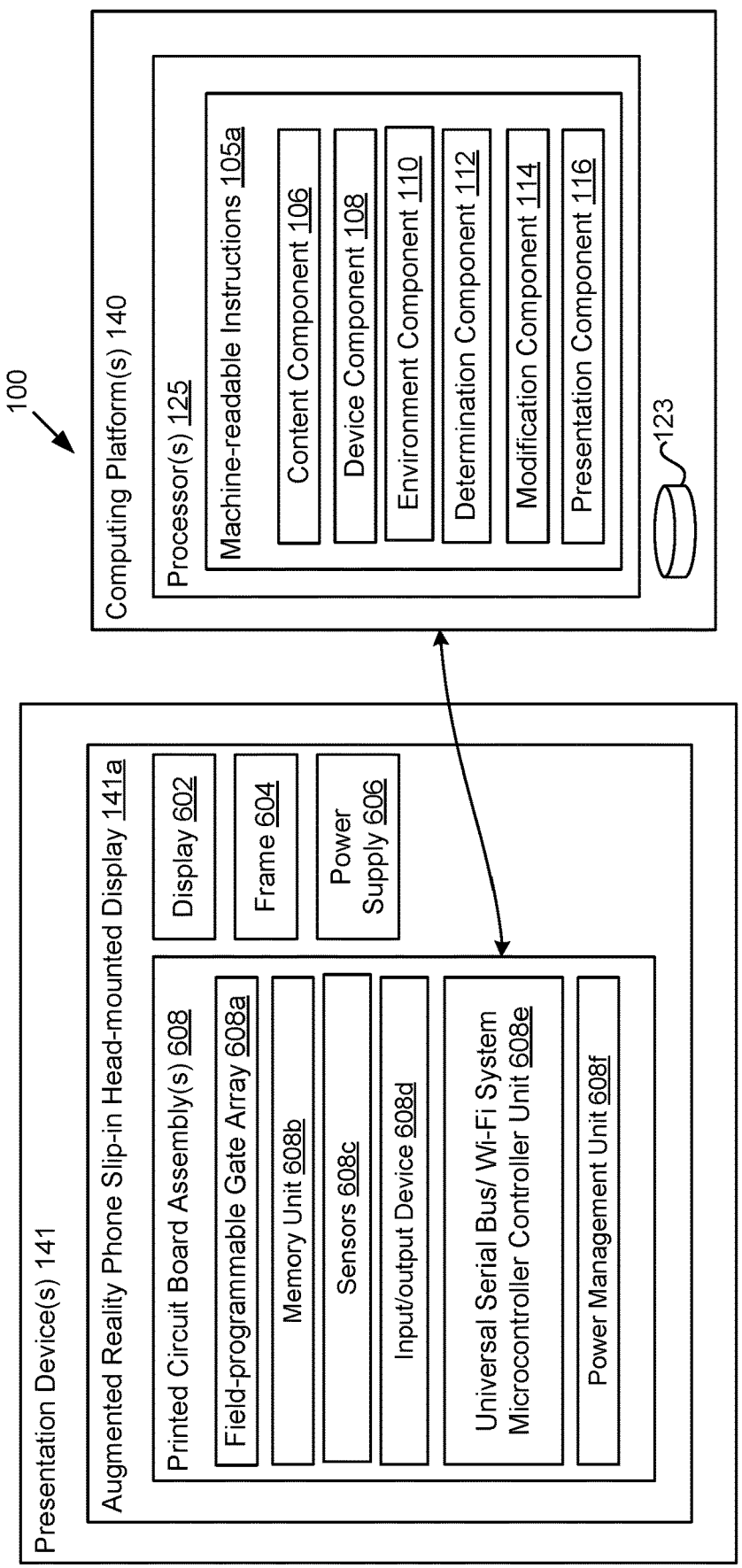
FIG. 1A illustrates a system for facilitating providing an interactive space with an intended appearance on an augmented reality phone slip-in head-mounted device, in accordance with one or more implementations.

FIG. 1A illustrates a system 100 for facilitating providing an interactive space with an intended appearance on an augmented reality phone slip-in head-mounted device. In some implementations, system 100 configured to facilitate providing an interactive space with an intended appearance may include one or more computing platform(s) 140, one or more presentation device(s) 141, and/or other components. Presentation device(s) 141 may be an augmented reality phone slip-in head-mounted device 141a and/or other devices. Computing platform(s) 140 may be removably coupled to augmented reality phone slip-in head-mounted device 141a. Computing platform(s) 140 may be configured to removably and operationally connect to augmented reality phone slip-in head-mounted device 141a. Connection may be wired and/or wireless. Operational connection may refer to a connection which may facilitate communication of information between computing platform(s) 140 and augmented reality phone slip-in head-mounted device 141a.

In some implementations, augmented reality phone slip-in head-mounted device 141a may include one or more of a display 602, a frame 604, a power supplies 606, a printed circuit board assembly(s) 608, and/or other components. Display 602 may include one or more light sources and/or optical elements (such as lenses). Display 602 may be configured to provide the interactive space and/or visual content. The visual content presented by display 602 may be modified and/or altered such that the visual content perceived by the user may have an intended appearance.

Frame 604 may include one or more chassis, straps, paddings, visors, and/or other components. Frame 604 may be configured to mount presentation device(s) 141 on a head of a user. Frame 604 may be configured to mount the augmented reality phone slip-in head-mounted device 141a on a head of a user.

Printed circuit board assembly(s) 608 may include one or more a field-programmable gate array 608a, a memory unit 608b, sensors 608c (such as a camera and/or other sensors), input/output devices 608d, a Universal Serial Bus/Wi-Fi system microcontroller controller unit 608f, a power management unit 608f, and/or other components. Printed circuit board assembly(s) 608 may include one or more physical processors configured to facilitate communication between computing platform(s) 140 and presentation device(s) 141.

Computing platform(s) 140 may be a mobile computing device such as a smartphone. Computing platform(s) 140 may include one or more one or more physical processor(s) 125, electronic storages 123, and/or other components. In some implementations, one or more physical processor(s) 125 may be configured by machine-readable instructions 105a. Executing machine-readable instructions 105a may cause one or more physical processor(s) 125 to facilitate providing the interactive space with the intended appearance. Machine-readable instructions 105a may include one or more computer program components. The one or more computer program components may include one or more of a content component 106, a device component 108, an environment component 110, a determination component 112, a modification component 114, a presentation component 116, and/or other components.

Figure 1B:
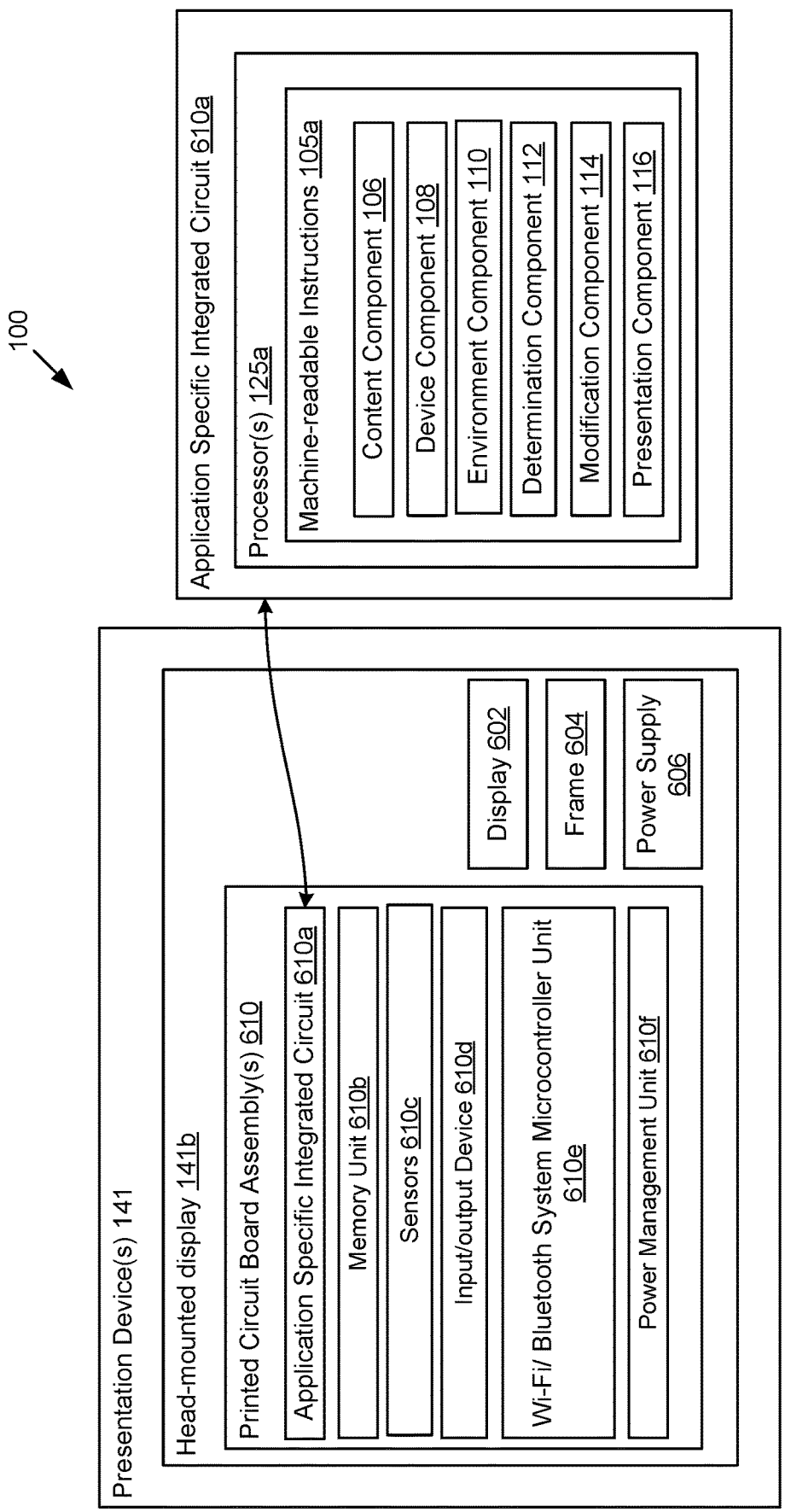
FIG. 1B illustrates the system for facilitating providing an interactive space with an intended appearance on an augmented reality head-mounted device, in accordance with one or more implementations.

FIG. 1B illustrates the system for facilitating providing an interactive space with an intended appearance on an augmented reality head-mounted device, in accordance with one or more implementations. In some implementations, system 100 configured to facilitate providing an interactive space with an intended appearance may include one or more presentation device(s) 141 and/or other components. Presentation device(s) 141 may be a head-mounted display 141b and/or other devices. In some implementations, head-mounted display 141b may include one or more of display 602, frame 604, power supplies 606, printed circuit board assembly(s) 610, and/or other components.

Printed circuit board assembly(s) 610 may include one or more of an application specific integrated circuit 610a, memory unit 610b, sensors 610c, input/output devices 619d, a Wi-Fi/Bluetooth system microcontroller unit 610e, power management unit 610f, and/or other components.

In some implementations, application specific integrated circuit 610a may include one or more one or more physical processor(s) 125a and/or other components. In some implementations, one or more physical processor(s) 125a may be configured by machine-readable instructions 105a. Executing machine-readable instructions 105a may cause one or more physical processor(s) 125a to facilitate providing the interactive space with the intended appearance. Machine-readable instructions 105a may include one or more computer program components. The one or more computer program components may include one or more of content component 106, device component 108, environment component 110, determination component 112, modification component 114, presentation component 116, and/or other components.

Figure 1C:
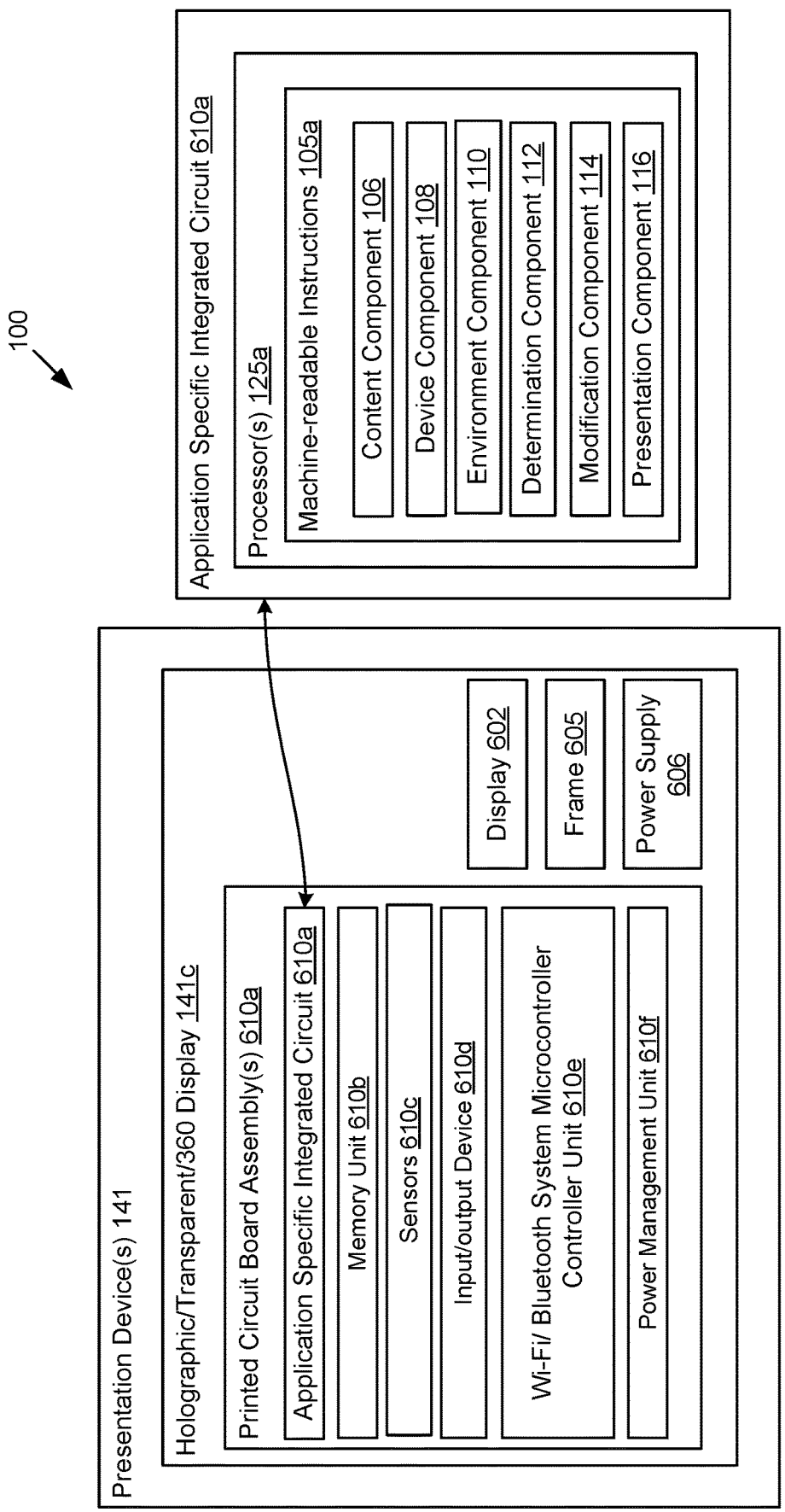
FIG. 1C the system for facilitating providing an interactive space with an intended appearance on a holographic or transparent or 360 display, in accordance with one or more implementations.

FIG. 1C the system for facilitating providing an interactive space with an intended appearance on a holographic or transparent or 360 display, in accordance with one or more implementations. In some implementations, system 100 configured to facilitate providing an interactive space with an intended appearance may include one or more presentation device(s) 141 and/or other components. Presentation device(s) 141 may be a holographic/transparent/360 display 141c and/or other devices. In some implementations, holographic/transparent/360 display 141c may include one or more of display 602, frame 605, power supplies 606, printed circuit board assembly(s) 610, and/or other components.

Frame 605 may include one or more chassis, motors, and/or other components. Frame 605 may be configured to support individual components of presentation device(s) 141. The motors of frame 605 may be configured to control movements of the individual components of presentation device(s) 141 and/or presentation device(s) 141.

Figure 1D:
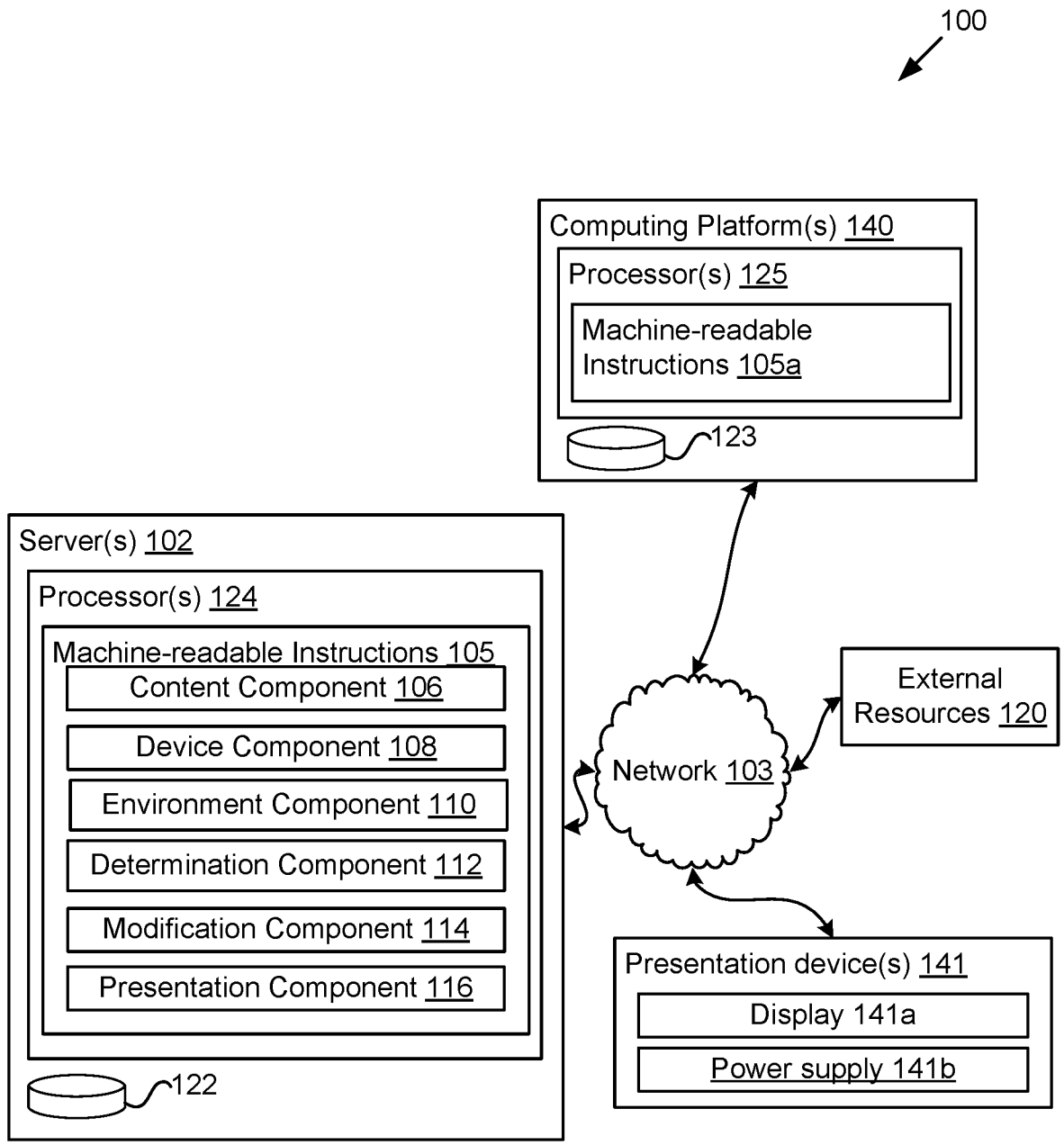
FIG. 1D illustrates the system with a server, presentation device, and computing platform for facilitating providing an interactive space with an intended appearance, in accordance with one or more implementations.

FIG. 1D illustrates a system 100 configured to facilitate providing an interactive space with an intended appearance. The interactive space may be virtual content and/or other information. The virtual content may be presented on a presentation device. The visual content of the virtual content may be superimposed over the perspective of the physical real-world environment. The visuals of the virtual content may be altered based on the characteristics of the presentation device and the physical real-world environment such that the virtual content may appear as intended. The visuals of the virtual content may be referred to as visual content.

In some implementations, system 100 configured to facilitate providing an interactive space with an intended appearance may include one or more of one or more servers 102, one or more computing platform(s) 140, one or more presentation device(s) 141, one or more external resources 120, and/or other components. Users may access system 100 via computing platform(s) 140 and/or other devices.

In some implementations, server(s) 102 may include one or more of electronic storages 122, one or more physical processors 124, and/or other components. In some implementations, one or more physical processors 124 may be configured by machine-readable instructions 105. Executing machine-readable instructions 105 may cause one or more physical processors 124 to facilitate providing the interactive space with the intended appearance. Machine-readable instructions 105 may include one or more computer program components. The one or more computer program components may include one or more of content component 106, device component 108, environment component 110, determination component 112, modification component 114, presentation component 116, and/or other components.

Presentation device(s) 141 may be configured to effectuate presentation of virtual content and/or other content. Presentation device(s) 141 may be configured to display the virtual content and/or other content. Presentation device(s) 141 may be configured to present the virtual content superimposed over the perspective of the physical real-world environment. The virtual content may include an interactive space and/or other information. Presentation device(s) 141 may be configured to generate images forming the virtual content.

Presentation device(s) 141 may include an augmented reality (AR) head-mounted display device, a holographic device, a transparent display device, a 360 display device, a projection device, a display device, and/or other devices. The head-mounted display device may be configured to be mounted on a head of a user. The projection device may be configured to project visuals of the virtual content in a real-world environment. The visuals of the of the virtual content may include graphical features. Presentation device(s) 141 may be configured to effectuate presentation of the virtual content that may be superimposed over the perspective of the physical real-world environment. The display device may be configured to display the visuals of the virtual content to be perceived and/or viewed by a user. Presentation device(s) 141 may be configured to general visuals forming the virtual content perceived by the user to lie within a field of view of the user. Presentation device(s) 141 may be configured to effectuate presentation of the virtual content that may be superimposed over the perspective of the physical real-world environment within the field of view of the user. Presentation device(s) 141 may include one or more of one or more light sources, one or more optical elements, one or more sensors, one or more peripherals, power supply 141b, and/or other components. The one or more light sources and one or more optical elements may form a display 141a of presentation device(s) 141. In some implementations, presentation device(s) 141 may include one or more of a stereo sensor pair and/or other components.

In some implementations, power supply 141b may be a battery coupled to presentation device(s) 141. In some implementations, power supply 141b may be a battery of another device coupled to presentation device(s) 141. For example, power supply 141b may be a battery of computing platform(s) 140.

In some implementations, presentation device(s) 141 may include one or more stripe and/or other coupling devices for mounting presentation device(s) 141 on the head of a user.

A light source may be configured to emit light forming images of the virtual content and/or other content. An individual light source may comprise one or more of a microelectromechanical systems (MEMS) RGB laser scanner, a microLED microdisplay, an LED illuminated liquid crystal on silicon (LCOS) microdisplay, an RGB laser LCOS microdisplay, a digital light projector (DLP), a digital micromirror device (DMD), a liquid crystal display (LCD), an organic light-emitting diode (OLED) display, an OLED microdisplay, and/or other light sources.

An optical element may be configured to provide light emitted from one or more light sources to one or more eyes of the user. The optical element may comprise a reflective, or partially reflective, surface configured to reflect light into an eye of a user. The optical element may be configured to provide light emitted from one or more light sources to one or more eyes of the user such that the virtual content appears to be superimposed over the perspective of the physical real-world environment within the field of view of the user. A reflective and/or partially reflective material may comprise one or more ZEONEX, Cyclo Olefin Polymer (COP), Cyclic Olefin Copolymer (COC), polycarbonate, Poly (methyl methacrylate) (PMMA), and/or other materials. An optical element may comprise a waveguide and/or other components. An optical element comprising a waveguide and/or other components may be configured to couple light into the optical element, propagate light through the optical element, and/or guide the light out of the optical element into an eye of the user. An optical element may comprise at least part of a visor and/or transparent display of presentation device 104. In some implementations, the light source and the optical element may make up a display (such as display 602) of presentation device(s) 141.

One or more sensors of presentation device(s) 141 may include one or more light sensors, orientation sensors, depth sensor, and/or other devices. By way of non-limiting example, the light sensors may include one or more of a camera, an IR camera/emitter pair, and/or other light sensors.

In some implementations, the light sensors may be configured to generate output signals conveying visual information and/or other information. The visual information may define visuals within a field of view of the image sensor and/or other content. The visuals may include depictions of real-world objects and/or surfaces. The visuals may be in the form of one or more images, videos, and/or other visual information. The visual information may define environmental characteristics within a field of view of the image sensor and/or other content. The environmental characteristics may include ambient light levels, color, and/or other visual information. The field of view of the light sensors may be a function of a position and an orientation of a computing platform.

In some implementations, a light sensor may comprise one or more of a photosensor array (e.g., an array of photosites), a charge-coupled device sensor, an active pixel sensor, a complementary metal-oxide semiconductor sensor, an N-type metal-oxide-semiconductor sensor, and/or other devices. In some implementations, the visual information may define the visuals of the user.

An orientation sensor may be configured to generate output signals conveying orientation information and/or other information. Orientation information derived from output signals of an orientation sensor may define an orientation. In some implementations, orientation may refer to one or more of a pitch angle, a roll angle, a yaw angle, and/or other measurements. An orientation sensor may include an inertial measurement unit (IMU) such as one or more of an accelerometer, a gyroscope, a magnetometer, and/or other devices.

A depth sensor may be one or more of a depth camera, a time-of-flight sensor, and/or other devices. In some implementations, sensor output of a depth sensor or depth camera may comprise position information and/or other information. Position information may include a set of points (also referred to as a point cloud) that may lie on surfaces of real-world objects within a range of the sensor, and/or other sensor output. Position information may specify individual ranges of the individual points within three-dimensional space.

The one or more peripherals may include one or more of an audio output device (e.g., speaker), an audio input device (e.g., a microphone), an input device, and/or other devices. In some implementations, one or more peripherals may be incorporated into computing platform(s) 140. In some implementations, the one or more peripherals may be removably coupled to presentation device(s) 141, computing platform(s) 140, and/or other devices. In some implementations, the one or more peripherals may be integrated in presentation device(s) 141, computing platform(s) 140, and/or other devices. The input devices may include one or more of a joystick, a sensor, a touch-enabled input device, a keypad, a controller, and/or other input devices.

The touch-enabled input device may be a touch screen and/or other devices. The touch screen may include one or more of a resistive touchscreen, a capacitive touchscreen, a surface acoustic wave touchscreen, an infrared touchscreen, an optical imaging touchscreen, an acoustic pulse recognition touchscreen, and/or other touchscreens. The touch-enabled input device may be configured to generate output signals conveying touch gesture information defining touch gesture inputs of the user.

The input devices may be configured to obtain user input and/or other information. The user input may specify instructions for system 100. The user input may specify instructions for presentation device(s) 141, computing platform(s) 140, and/or other devices. The user input may include one or more of a body gesture input, touch gesture input, controller input, text input, audio input, movement input, and/or other inputs.

The body gesture input may include information defining movement of a body part of the user, including movement of a hand, arm, leg, lip, and/or other body parts of the user. In some implementations, the body gesture input may be obtained for visuals of the user. In some implementations, the body gesture input may convey sign language and/or other instructions. The sign language may specify instructions.

The touch gesture input may include information defining one or more movements. The movements may include one or more of a finger press, a finger tap, a finger swipe, a finger flick, a finger drag, a pinch, a touch-and-hold, a scroll, and/or other finger movements. These movements may similarly be carried out using a tool, such as a stylus.

The controller input may include information defining one or more of a key/button pressing input, a key/button tapping input, a swiping input, a flick input, a drag input, a key/ button press-and-hold input, a scroll input, and/or other inputs from a controller. The controller input may include one or more of a movement of a mouse, a movement of a mouse while holding a button on the mouse, a press of one or more keys of a keyboard, a movement of a joystick, a movement of a joystick while holding of a button on a controller, and/or other controller inputs.

In some implementations, the text input may be obtained from a keyboard, an audio input device, and/or other devices. The text input may include one or more words in one or more languages. In some implementations, text input may be obtained from one or more voice recognition systems, natural language processing systems, gesture recognition systems, and/or other systems. The voice recognition systems may obtain audio signals from a user conveying one or more words and/or phrases. The natural language processing systems may obtain audio signals from a user and determine one or more words and/or phrases being conveyed by the user. The gesture recognition systems may obtain visual of the user conveying one or more words and/or phrases and/or instructions. The gesture recognition systems may interpret sign language.

The audio input may include audio information defining audio signals of the user. The audio signal of the user may be captured by a microphone and/or other audio capture devices. The audio signals from the user may be a voice command. In some implementations, instructions may be associated with the voice commands. In some implementations, audio input may be obtained from the one or more voice recognition systems, natural language processing systems, and/or other systems.

The movement input may include information defining movements of computing platform(s) 140 and/or other devices. The movements may include a shaking movement, a projection movement, a rotation movement, and/or other movements. The shaking movement may include the user shaking computing platform(s) 140 and/or other devices.

Computing platform(s) 140 may be configured to removably and operationally connect to one or more of presentation device(s) 141, the one or more peripherals, server(s) 102 and/or other components. Connection may be wired and/or wireless. Operational connection may refer to a connection which may facilitate communication of information between computing platform(s) 140 and individual components.

Computing platform(s) 140 may be configured to control one or more components of system 100. By way of non-limiting illustration, computing platform(s) 140 may be configured to control one or more presentation device(s) 141, server(s) 102, and/or other components of system 100. Computing platform(s) 140 may be configured to removably and/or operationally connect to individual components of system 100 to provide processing capabilities for individual components of system 100.

Computing platform(s) 140 may be configured to provide processing capabilities for one or more of presentation device(s) 141, the one or more peripherals, server(s) 102, and/or other components. Computing platform(s) 140 may be configured to obtain information from one or more of presentation device(s) 141, the one or more peripherals, server(s) 102, and/or other components. Computing platform(s) 140 may be configured to provide information to one or more of presentation device(s) 141, the one or more peripherals, server(s) 102, and/or other components. Computing platform(s) 140 may be configured to provide information to individual components in response to information received from the individual component. Computing platform(s) 140 may be configured to provide restructured information to individual components based on the information received from the individual component. For example, computing platform(s) 140 may determine some information based on the information received from individual components, and provide the determined information to the individual components.

The information provided to one or more of presentation device 141, the one or more peripherals, and/or other components may include control signals and/or other information. In some implementations, computing platform(s) 140 may communicate with presentation device 141 to control emission of light by one or more light sources of presentation device 141. In some implementations, computing platform(s) 140 may communicate with the one or more peripherals by receiving information from the one or more peripherals. For example, computing platform(s) 140 may receive user inputs from the one or more peripherals. In some implementations, computing platform(s) 140 may receive information from one or more components of presentation device 141. The information received may user input and/or other information.

Computing platform(s) 140 may be one or more of a mobile computing device, a personal computer, a wearable computing device, a game console, and/or other computing platforms. By way of non-limiting example, the mobile computing device may be one or more of a smartphone, smartwatch, and/or other devices. A wearable computing device may be a head-mounted computing device and/or other wearable devices.

In some implementations, computing platform(s) 140 may include a form factor configured to allow ease of carry, mounting, worn, and/or otherwise be coupled to a device. For example, computing platform(s) 140 may include a form factor configured to allow computing platform(s) 140 to be coupled to presentation device(s) 141, the user, and/or other devices and/or objects. By way of non-limiting example, computing platform(s) 140 may include a form factor configured to allow computing platform(s) 140 to be coupled to the head-mounted display device and/or other devices.

Computing platform(s) 140 may include the one or more peripherals, the one or more sensors, one or more displays, and/or other components. By way of non-limiting example, computing platform(s) 140 may include the one or more cameras, the one or more sensors, the one or more displays, and/or other components. The one or more sensors of computing platform(s) 140 may include one or more of the light sensor, the orientation sensor, an audio sensor, and/or other sensors. It is noted that computing platform(s) 140 may represent an individual computing platform and/or more than one computing platform that may be similarly configured as described herein.

The displays may be a device configured to effectuate presentation of the virtual content and/or other content. The displays include one or more of a touch-enabled display (e.g., the touchscreen), an LCD display, a LED display, an OLED display, a projector, and/or other displays. In some implementations, the display may be a video projector and/or other devices.

In some implementations, an audio sensor may be configured to generate output signals conveying audio information and/or other information. The audio information may define audio from the user (e.g., utterances of the user), audio around the user (such as ambient audio), and/or other information. In some implementations, an audio sensor may include one or more of a microphone, a micro-electro-mechanical microphone, and/or other devices.

In some implementations, computing platform(s) 140 may include one or more of electronic storages 123, one or more physical processor(s) 125, and/or other components that may be the same and/or similar to electronic storages 122, physical processor(s) 124, and/or other components of server(s) 102. Computing platform(s) 140 may execute machine-readable instructions 105*a* that may be the same and/or similar to machine-readable instructions 105 to cause physical processor(s) 125 to provide the group performance. Machine-readable instructions 105*a* may include one or more computer program components similar and/or the same as the one or more computer program components of machine-readable instructions 105. By way of non-limiting example, physical processor(s) 125 may be used to provide processing capabilities for physical processor(s) 124. In some implementations, physical processor(s) 125 may be used to provide processing capabilities for the one or more components of machine-readable instructions 105.

Electronic storages 122 may be configured to store one or more of content information, reference information, display information, and/or other information. The content information may define the virtual content and/or other information. The reference information defining a set of expected values of visual parameters of the virtual content and/or other information. The display information may define the characteristics of presentation device(s) 141 and/or other devices and/or other information.

The content information may define the interactive space and/or other information. The virtual content may include the interactive space and/or other information. The interactive space may be superimposed over a perspective of a physical real-world environment of a user. The interactive space may include an augmented reality environment, an augmented reality object, and/or other content. The virtual content may include the augmented reality environment, the augmented reality objects, and/or other virtual content.

An augmented reality environment, as used herein, may refer to a simulated physical space that represents a virtual environment that may be superimposed over a perspective of the physical real-world environment of the user. The augmented reality environment may be the simulated physical space. The simulated physical space may be in a three-dimensional space, two-dimensional space, and/or other simulated physical spaces. The simulated physical space may depict the virtual environment and/or other environments. In some implementations, the simulated physical space may include a head-up display (HUD) overlaid on the three-dimensional, two-dimensional space, and/or other simulated physical spaces. A HUD may comprise one or more of a mini-map, menu, one or more application information readings, and/or other information. In some implementations, the simulated physical space may make up the environment of the augmented reality content and/or other content.

An augmented reality object, as used herein, may refer to virtual content that represents a virtual object that may be superimposed over the perspective of the physical real-world environment of the user. The virtual objects may be positioned in a topography of the simulated physical space. The virtual objects may include one or more of a virtual entity, a virtual structure, a virtual item, and/or other virtual objects.

By way of non-limiting example, the virtual entity may include a depiction of a character/avatar, a group of characters/avatars, a vehicle, and/or other entities. In some implementations, the character/avatar and/or group of characters/avatars may occupy/ride the vehicle. The character/avatar may be a depiction of a fictional character and/or a real-world character. The vehicle may be one or more of a motorized vehicle, flying vehicle, and/or vehicles. The virtual entity may be controlled by a user, preprogrammed behaviors, an artificial intelligence, and/or other controlling systems and/or entities.

By way of non-limiting example, the virtual structure may include a depiction of a building, a store, a landmark, and/or other virtual structures. In some implementations, the virtual structure may be a representation of a real-world structure. In some implementations, the virtual structure may be a virtual-world structure. In some implementations, the virtual structure may include the virtual entity, and/or other virtual content. For example, the virtual entity may be within and/or occupy the virtual structure.

The virtual objects may be static or dynamic. For example, the virtual objects may be positioned in a fixed location (e.g., static) or move about locations in the topography of the simulated physical space (e.g., dynamic). In some implementations, the virtual structures and/or virtual entities may be static. In some implementations, the virtual entities may be dynamic. In some implementations, the virtual structures may be static, and the virtual entities may be dynamic.

The reference information may define the set of expected values of the visual parameters of the virtual content and/or other information. In some implementations, the reference information may define a range of expected values of the visual parameters of the virtual content and/or other information. The set of expected values and/or range of expected values of the visual parameters may specify an intended appearance of the visuals of the virtual content and/or other content. The intended appearance of the visuals of the virtual content may be the appearance of the visuals of the virtual content that should be perceived by the user on presentation device(s) 141. For example, the intended appearance of the visuals of the virtual content may be an appearance of the visuals of the virtual content specified by a creator of the virtual content. By way of non-limiting example, if a virtual object was designed by a creator to have the color red based on the reference information. The intended appearance of the virtual object should be red, and the user should perceive the virtual object with red. For example, if the set of expected values of the visual parameters of the virtual content specify the intended appearance of the virtual object of an apple to have a first color (e.g., the red), then the user should perceive the apple on presentation device(s) 141 with the first color.

The set of expected values and/or range of expected values of the visual parameters may be specified for one or more individual pixels and/or a group of pixels. The visual parameters may include one or more of a brightness parameter, a contrast parameter, a color parameter, and/or other parameters. The intended appearance of the visuals of the virtual content may be referred to as expected virtual content from here on out.

In some implementations, the expected virtual content may be predetermined by a user and/or creator of the virtual content. The user and/or the creator may determine the visual parameters and/or other information of the expected virtual content. The user and/or the creator may determine the visual parameters including the brightness parameter, the contrast parameter, the color parameter, and/or other parameters of the expected virtual content. The user and/or the creator may determine the set of expected values and/or range of expected values for the visual parameters.

In some implementations, the expected virtual content may be determined by the user of the virtual content. The user may set the visual parameters of the expected virtual content. The user may set the visual parameters including the brightness parameter, the contrast parameter, the color parameter, and/or other parameters of the expected virtual content. The user may set a range for the visual parameters.

In some implementations, the user may set by visual parameters by selecting one or more preset settings. Individual preset settings may specify different visuals for the expected virtual content. Individual preset settings may specify different visual parameters for the expected visual content. For example, a first preset setting may be more saturated, a second preset setting may be brighter, a third preset setting may be more colorful, and/or other presets may specify other visuals preferences for the expected visual content. The user may select the preset settings via user input. The selection of the preset settings may determine the visual parameters of the expected visual content. In some implementations, the preset settings may specify the expected values for the individual visual parameters.

By way of non-limiting example, the preset settings may be configured for different types of activities in the expected visual content. The different types of activities include standard event, a cinematic event (e.g., movies), sporting event, gaming event (e.g., playing video games), and/or other types of activities. In some implementations, the user may select the preset settings regardless of the types of activities in the expected visual content. In some implementations, the determination component 112 may identify the types of activities in the expected visual content, and select a preset setting for the type of activity in the expected visual content identified.

The display information may define characteristics of presentation device(s) 141 and/or other information. The characteristics of presentation device(s) 141 may include an appearance of the virtual content presented on presentation device(s) 141. The characteristics of presentation device(s) 141 may include the range of colors, brightness, contrast, resolution, and/or other features presentation device(s) 141 may be capable of presenting. In some implementations, the characteristics of presentation device(s) 141 may be based on the one or more light sources and/or optical elements of presentation device(s) 141. For example, presentation device(s) 141 with an LED light source may present virtual content in a particular range of colors, brightness, contrast, and/or resolution that may be different compared to an OLED light source.

The display information may define characteristics of the virtual content effectuated by presentation device(s) 141 and/or other devices. The display information may define the characteristics of the light emitted from one or more light sources to the one or more eyes of the user. The light emitted from one or more light sources to the one or more eyes of the user may include the virtual content and/or other information. Different presentation device(s) 141 may include different light sources and/or optical elements which may have different characteristics. The different characteristics of the different light sources and/or optical elements may cause the visuals of the virtual content to appear different on different presentation device(s) 141.

For example, a first presentation device with an LED light sources may effectuate presentation of visuals of the virtual content with a first appearance, and a second presentation device with an OLED light source may effectuate presentation of visuals of the virtual content with a second appearance. The first appearance and the second appearance may be different because of the different nature and/or characteristic of the LED light sources and the OLED light sources. For example, the color spectrum the LED light source and the OLED light source may be capable to presenting may be different, so the same visuals of the virtual content presented by the two different light sources may be different. By way of non-limiting example, the virtual content of the apple with the first color may be presented on the first presentation device may appear to have the first appearance. The virtual content of the apple with the first color presented by the second presentation device may appear to have the second appearance.

In some implementations, the appearance of the virtual content presented on presentation device(s) 141 may not appear as the expected virtual content. The virtual content presented on different presentation device(s) 141 may have different characteristics. The virtual content presented of presentation device(s) 141 may not appear as the expected virtual content depending on the characteristics of the presentation device(s) 141. For example, if the expected virtual content was intended to be presented by an OLED light source, and presentation device(s) 141 presents the virtual content with an LED light source, then the virtual content presented may appear as the expected virtual content.

The display information may define a set of display values of the visual parameters of the virtual content presented by presentation device(s) 141 and/or other devices. The set of display values of the visual parameters of the virtual content presented by presentation device(s) 141 may be based on output signals of the presentation device(s) 141. The output signals of the presentation device(s) 141 may convey the graphical features of the virtual content presented by presentation device(s) 141. In some implementations, the set of display values of the visual parameters may define the graphical features of the virtual content presented by presentation device(s) 141. The display values of the visual parameters may specify the appearance of the visuals of the virtual content presented on presentation device(s) 141 and/or other devices. The display values of the visual parameters may include one or more display values for one or more of the brightness parameter, the contrast parameter, the color parameter, and/or other parameters. The display values of the visual parameters may specify the brightness, contrast, color, and/or other features of the virtual content presented on presentation device(s) 141. In some implementations, the display values of the visual parameters may specify the appearance of the visuals of the virtual content that may be superimposed over the perspective of the physical real-world environment. The display values of the visual parameters of the visuals of the virtual content presented by presentation device(s) 141 and/or other devices may or may not be the same as the expected values of the visual parameters of the virtual content. The display values of the visual parameters of the visuals of the virtual content presented by presentation device(s) 141 and/or other devices may or may not be within the range of the expected values of the visual parameters of the virtual content. The display values of the visual parameters of the visuals of the virtual content presented by presentation device(s) 141 may or may not be the same as the expected values and/or within the range of the expected values because the appearance of the visuals presented on presentation device(s) 141 may be different compared to the expected virtual content.

The set of display values of the visual parameters may specify the characteristics for one or more individual pixels and/or a group of pixels of presentation device(s) 141 presenting the virtual content. For example, the set of display values of the visual parameters may specify the brightness, contrast, color, and/or other graphical features of the one or more individual pixels and/or group of pixels of presentation device(s) 141 presenting the virtual content. The set of display values may specify the visual parameters for one or more individual pixels and/or a group of pixels of presentation device(s) 141 and/or other devices.

Content component 106 may be configured to obtain the content information, the reference information, and/or other information. Content component 106 may be configured to obtain the content information and/or the reference information from one or more of electronic storage (such as electronic storage 122 and/or 123), external resource(s) 120, and/or other storage locations. In some implementations, content component 106 may be configured to obtain the content information, the reference information, and/or other information from computing platform(s) 140 and/or other devices.

Content component 106 may be configured to determine the reference information and/or other information. Content component 106 may be configured to determine the reference information based on the content information and/or other information. Content component 106 may be configured to determine the set of expected values of the visual parameters of the expected virtual content and/or other information. Content component 106 may be configured to determine the set of expected values of the visual parameters of the expected virtual content that may be superimposed over the perspective of the physical real-world environment.

In some implementations, content component 106 may be configured to determine the set of expected values of the visual parameters of the expected virtual content defined by content information. Content component 106 may be configured to determine the set of expected values of the visual parameters of the expected virtual content based on the content information and/or other information. Content component 106 may be configured to identify the visual of the expected virtual content from the content information. Content component 106 may be configured to determine the set of expected values of the visual parameters of the expected virtual content based on the information defining the visual of the virtual content. For example, content component 106 may identify a brightness, a contrast, a color, and/or other graphical features of the expected virtual content defined by the content information, and determine the set of expected values of the visual parameters of the expected virtual content based on the graphical features of the expected virtual content.

Content component 106 may be configured to determine the brightness parameter, the contrast parameter, the color parameter, and/or other parameters of the expected virtual content from based on the visual of the expected virtual content and/or other information. Content component 106 may be configured to identify a light intensity of the visual of the expected virtual content, and determine the expected value of the brightness parameter and/or other parameters. Content component 106 may be configured to identify the light intensity of individual pixels and/or groups of pixels the visual of the expected virtual content to determine the expected value of the brightness parameter and/or other parameters.

Content component 106 may be configured to identify a contrast of the visual of the expected virtual content, and determine the expected value of the contrast parameter and/or other parameters. Content component 106 may be configured to identify the contrast of individual pixels and/or groups of pixels the visual of the expected virtual content to determine the expected value of the contrast parameter and/or other parameters.

Content component 106 may be configured to identify colors of the visual of the expected virtual content, and determine the expected value of the color parameter and/or other parameters. Content component 106 may be configured to identify the colors of individual pixels and/or groups of pixels the visual of the expected virtual content to determine the expected value of the color parameter and/or other parameters.

Referring to FIG. 1A, in some implementations, the content information and/or the reference information may be stored in electronic storage 123 and/or other storage locations. Content component 106 may be configured to obtain the content information and/or the reference information from one or more of electronic storage (such as electronic storage 123) and/or other storage locations. In some implementations, content component 106 may be configured to store the content information and/or the reference information in memory unit 608b and/or other storage locations. In some implementations, content component 106 may be configured to obtain the content information and/or the reference information from a server similar to server(s) 102 and store the obtained content information and/or the reference information in memory unit 608b, electronic storage 123, and/or other storage locations.

Referring to FIG. 1B, in some implementations, content component 106 may be configured to obtain the content information and/or the reference information from one or more of electronic storage and/or other storage locations. In some implementations, content component 106 may be configured to store the content information and/or the reference information in memory unit 610b and/or other storage locations.

Referring back to FIG. 1D, device component 108 may be configured to obtain the display information and/or other information. Device component 108 may be configured to obtain the display information from one or more of electronic storages 122, external resource(s) 120, and/or other storage locations. In some implementations, device component 108 may be configured to obtain the display information from computing platform(s) 140, presentation device(s) 141, and/or other devices. In some implementations, device component 108 may be configured to obtain the display information from the user. The user may determine the display information and provide device component 108 with the display information via user input. For example, the user may view the visuals of the virtual content provided by presentation device(s) 141, and determine the display information based on visual inspection, and provide device component 108 with the display information via user inputs. Referring to FIG. 1A, in some implementations, device component 108 may be configured to obtain the display information from display 602 and/or other components.

Device component 108 may be configured to determine the display information and/or other information. Device component 108 may be configured to determine the display information based on the visuals of the virtual content presented by presentation device(s) 141 and/or other devices. Device component 108 may be configured to determine the display information and/or other information. Device component 108 may be configured to determine the display information based on the output signals of presentation device(s) 141 and/or other information. Device component 108 may be configured to determine the display information based on graphical features of the virtual content presented by presentation device(s) 141 and/or other devices.

Device component 108 may be configured to determine the graphical features of the virtual content presented by presentation device(s) 141 based on the one or more light sources and/or the one or more optical elements of presentation device(s) 141. Device component 108 may be configured to identify presentation device(s) 141 effectuating presentation of the virtual content and/or other information. Device component 108 may be configured to identify the one or more light sources and/or the one or more optical elements of presentation device(s) 141 used to present the virtual content. Device component 108 may be configured to determine one or more characteristics of the one or more light sources and/or the one or more optical elements of presentation device(s) 141 used to present the virtual content. For example, the one or more characteristics of the one or more light sources and/or the one or more optical elements may include a light intensity characteristic, a color composition characteristic, a contrast characteristic, a resolution characteristic, and/or other characteristics. The characteristics of the one or more light sources and/or optical elements may specify the graphical features of the virtual content presented by presentation device(s) 141. Device component 108 may be configured to determine the appearance (including the graphical features) of the visuals of the virtual content presented by presentation device(s) 141 from the one or more characteristics of the one or more light sources and/or the one or more optical elements.

In some implementations, device component 108 may be configured to determine the one or more characteristics of the light emitted from one or more light sources to one or more eyes of the user. The light emitted from one or more light sources to one or more eyes of the user may include the virtual content. Device component 108 may be configured determine the appearance (including the graphical features) of the visuals of the virtual content presented by presentation device(s) 141 from the one or more characteristics of the light emitted from one or more light sources to one or more eyes of the user.

For example, device component 108 may be configured to identifying whether presentation device(s) 141 may be using the LED light source or the OLED light source to effectuate presentation of the virtual content. Device component 108 may be configured determine the one or more characteristics of the light source used by presentation device(s) 141 to effectuate presentation of the virtual content. Device component 108 may be configured to determine the display information from the one or more characteristics of the light source used by presentation device(s) 141.

By way of non-limiting example, device component 108 may identify the first presentation device that may be effectuating presentation of the virtual content. Device component 108 may determine the light sources (e.g., the LED light source) used by the first presentation device. Device component 108 may determine the one or more characteristics of the light sources of the first presentation device. Device component 108 may determine the appearance (including the graphical features) of the virtual content presented by the first presentation device based on the characteristics of the light sources of the first presentation device. Device component 108 may determine the display information from the appearance (including the graphical features) of the virtual content presented by the first presentation device.

In some implementations, device component 108 may be configured to determine the set of display values of the visual parameters of the virtual content presented by presentation device(s) 141 based on the one or more characteristics of the one or more light sources and/or the one or more optical elements.

Device component 108 may be configured to determine the set of display values of the visual parameters of the virtual content presented by presentation device(s) 141 and/or other devices. Device component 108 may be configured to determine the set of display values of the visual parameters of the virtual content based on the output signals of presentation device(s) 141. The output signals of the presentation device(s) 141 may specify the graphical features of the virtual content presented on presentation device(s) 141. The output signals of the presentation device(s) 141 may convey values for one or more of the brightness parameter, the contrast parameter, the color parameter, and/or other parameters of the virtual content presented on presentation device(s) 141.

In some implementations, the display values of the visual parameters may specify the graphical features of the virtual content that may be superimposed over the perspective of the physical real-world environment. Device component 108 may be configured to determine the display values of the visual parameters for one or more of the brightness parameter, the contrast parameter, the color parameter, and/or other parameters. The display values for the brightness parameter may specify a brightness of the visuals of the virtual content presented on presentation device(s) 141. The display values for the contrast parameter may specify a contrast of the virtual content presented on presentation device(s) 141. The display values for the color parameter may specify a color composition of the visuals of the virtual content presented on presentation device(s) 141.

Device component 108 may be configured to determine the appearance and/or graphical features of the visuals of the virtual content presented on presentation device(s) 141 and/or other devices. Device component 108 may be configured to determine the graphical features of the visuals of the virtual content presented on presentation device(s) 141 from the output signals of the presentation device(s) 141 and/or other information. In some implementations, device component 108 may be configured to determine the graphical features of the visuals of the virtual content presented on presentation device(s) 141 from one or more sensors of presentation device(s) 141. For example, the light sensor of presentation device(s) 141 may monitor the graphical features of the visuals of the virtual content presented on presentation device(s) 141, and generate output signals defining the graphical features of the visuals of the virtual content. Device component 108 may be configured to generate the display values of the visual parameters based on the determined graphical features of the visuals of the virtual content presented on presentation device(s) 141.

Device component 108 may be configured to determine the light intensity characteristic, the color composition characteristic, the contrast characteristic, and/or other graphical features of the visuals of the virtual content presented by presentation device(s) 141. Device component 108 may be configured to determine the display value for the brightness parameter based on the light intensity characteristic and/or other information. Device component 108 may be configured to determine the display value for the color parameter based on the color composition characteristic and/or other information. Device component 108 may be configured to determine the display value for the contrast parameter based on the contrast characteristic and/or other information.

Device component 108 may be configured determine the set of display values of the visual parameters for individual pixels and/or groups of pixels of the visuals of the virtual content presented by presentation device(s) 141 and/or other devices. Device component 108 may be configured to determine the display value of the brightness parameter for individual pixels and/or groups of pixels of the visuals of the virtual content presented by presentation device(s) 141. Device component 108 may be configured to determine the display value of the color parameter for individual pixels and/or groups of pixels of the visuals of the virtual content presented by presentation device(s) 141. Device component 108 may be configured to determine the display value of the contrast parameter for individual pixels and/or groups of pixels of the visuals of the virtual content presented by presentation device(s) 141.

Environment component 110 may be configured to obtain environmental information and/or other information. Environment component 110 may be configured to obtain the environmental information from one or more of electronic storages 122, external resource(s) 120, and/or other storage locations. In some implementations, environment component 110 may be configured to obtain the environmental information from computing platform(s) 140, presentation device(s) 141, and/or other devices. For example, the one or more sensors of computing platform(s) 140, presentation device(s) 141, and/or other devices may convey information defining the surrounding environment, and environment component 110 may be configured to obtain the information defining the surrounding environment.

Referring to FIG. 1A, in some implementations, environment component 110 may be configured to obtain the environmental information from the one or more sensors of sensors 608c. Referring to FIG. 1B, in some implementations, environment component 110 may be configured to obtain the environmental information from the one or more sensors of sensors 610c.

Referring back to FIG. 1D, in some implementations, the environmental information may be conveyed by the sensors of computing platform(s) 140, presentation device(s) 141, and/or other devices. For example, the sensors of computing platform(s) 140, presentation device(s) 141, and/or other devices may be configured to generate output signals conveying the environmental information and/or other information. The sensors of computing platform(s) 140, presentation device(s) 141, and/or other devices configured to generate output signals conveying the environmental information may include the light sensor and/or other sensors. Environment component 110 may obtain the environmental information from computing platform(s) 140, presentation device(s) 141, and/or other devices.

The environmental information may define the physical real-world environment and/or other information. The environmental information may define the appearances of the physical real-world environment and/or other information. The environmental information may define visual features of the physical real-world environment and/or other information. The environmental information may define the physical real-world environment around computing platform(s) 140, presentation device(s) 141, and/or other devices. The environmental information may define the physical real-world environment that lies within a field of view of the sensors of computing platform(s) 140, presentation device(s) 141, and/or other devices. The environmental information may define the physical real-world environment around the user. The environmental information may define the physical real-world environment which the virtual content may be superimposed over.

The environmental information may define environmental characteristics of the physical real-world environment. The environmental characteristics may specify the characteristics of ambient light, color composition, and/or other characteristics of the physical real-world environment. The environmental information may define the environmental characteristics of the physical real-world environment that lie within the field of view of the sensors of computing platform(s) 140, presentation device(s) 141, and/or other devices. The environmental information may define the environmental characteristics of the physical real-world environment which the virtual content may be superimposed over. The characteristics of the ambient light may specify an intensity of ambient light, the position of a light source(s), and/or other information. The characteristics of the color composition may specify a color composition of the physical real-world environment.

In some implementations, the environmental information may define environmental values of the physical real-world environment and/or other information. The environmental values may specify the environmental characteristics of the physical real-world environment. The environmental values may specify the environmental characteristics of the physical real-world environment that lie within the field of view of the sensors of computing platform(s) 140, presentation device(s) 141, and/or other devices. The environmental values may specify the environmental characteristics of the physical real-world environment which the virtual content may be superimposed over.

The environmental values may specify the environmental characteristics of the physical real-world environment. Environment component 110 may be configured to determine the environmental values based on the output signals of the sensors of computing platform(s) 140, presentation device(s) 141, and/or other devices. The output signals of the sensors of computing platform(s) 140, presentation device(s) 141, and/or other devices may convey information of the environmental characteristics of the physical real-world environment. The output signals of the sensors of computing platform(s) 140, presentation device(s) 141, and/or other devices may convey information of the intensity of light, colors of light, and/or other information of the physical real-world environment.

The environmental values specifying the intensity of light of the physical real-world environment may specify the characteristics of ambient light and/or other information. The environmental values may specify the intensity of light of the physical real-world environment. The environmental values may specify the brightness of the physical real-world environment. By way of non-limiting example, the higher the environmental values may specify a greater intensity of light of the physical real-world environment. In some implementations, the environmental values may define the intensity of light in different areas of the physical real-world environment.

In some implementations, the environmental values may specify the intensity of light of the physical real-world environment that lies the field of view of the sensors of computing platform(s) 140, presentation device(s) 141, and/or other devices. In some implementations, the environmental values may specify the intensity of light of the physical real-world environment that lies within portions of the physical real-world environment in the field of view of the sensors of computing platform(s) 140, presentation device(s) 141, and/or other devices.

In some implementations, the environmental values may specify the intensity of light of the physical real-world environment which the virtual content may be superimposed over. In some implementations, the environmental values may specify the intensity of light in one or more areas of the physical real-world environment that which the virtual content may be superimposed over.

The environmental values specifying the colors in the physical real-world environment may specify the characteristics of the color composition and/or other information. The environmental values may specify the colors of light in the physical real-world environment. The colors in the physical real-world environment may be specified by one or more frequencies and/or combination of frequencies. The environmental values may specify a composition of primary colors in the physical real-world environment. In some implementations, individual environmental values may specify the composition of the individual primary colors in the physical real-world environment.

In some implementations, the environmental values may specify the colors in the physical real-world environment that lie the field of view of the sensors of computing platform(s) 140, presentation device(s) 141, and/or other devices. The environmental values may specify individual colors that makeup of the light that lie within the field of view of the sensors of computing platform(s) 140, presentation device(s) 141, and/or other devices. In some implementations, the environmental values may specify the colors in the physical real-world environment that lie within portions of the physical real-world environment in the field of view of the sensors of computing platform(s) 140, presentation device(s) 141, and/or other devices.

In some implementations, the environmental values may specify the colors in the physical real-world environment which the virtual content may be superimposed over. The environmental values may specify individual colors in the physical real-world environment that which the virtual content may be superimposed over. In some implementations, the environmental values may specify the colors in one or more areas of the physical real-world environment that which the virtual content may be superimposed over.

Environment component 110 may be configured to determine the environmental information and/or other information. Environment component 110 may be configured to determine the environmental information based on the environmental characteristics of the physical real-world environment. Environment component 110 may be configured to obtain output signals from the sensors of computing platform(s) 140, presentation device(s) 141, and/or other devices. Environment component 110 may be configured to determine the environmental information based on the output signals of the sensors of computing platform(s) 140, presentation device(s) 141, and/or other devices.

Environment component 110 may be configured to determine the environmental characteristics from the output signals of the sensors of computing platform(s) 140, presentation device(s) 141, and/or other devices. Environment component 110 may be configured to determine the characteristics of ambient light, color composition, and/or other characteristics of the physical real-world environment from the output signals of the sensors of computing platform(s) 140, presentation device(s) 141, and/or other devices. Environment component 110 may be configured to specify the characteristics of ambient light, color composition, and/or other characteristics of the physical real-world environment with the environmental values and/or other information.

Environment component 110 may be configured to determine an intensity of light of the physical real-world environment. Environment component 110 may be configured to determine the intensity of light of the physical real-world environment that lie within the field of view of the sensors of computing platform(s) 140, presentation device(s) 141, and/or other devices. Environment component 110 may be configured to determine the intensity of light of the physical real-world environment which the virtual content may be superimposed over.

Environment component 110 may be configured to determine an intensity of light of the physical real-world environment from the output signals of the sensors of computing platform(s) 140, presentation device(s) 141, and/or other devices. Environment component 110 may be configured to determine an intensity of light of the physical real-world environment from the characteristics of ambient light of the physical real-world environment. Environment component 110 may be configured to determine an intensity of light that lies within the field of view of the sensors of computing platform(s) 140, presentation device(s) 141, and/or other devices. In some implementations, the sensors may generate output signals conveying the intensity of light of the physical real-world environment.

In some implementations, environment component 110 may be configured to determine the environmental value specifying the intensity of light of the physical real-world environment. Environment component 110 may be configured to determine the environmental value specifying the intensity of light of the physical real-world environment from the characteristics of ambient light and/or other information. Environment component 110 may be configured to determine the environmental value specifying the intensity of light of the physical real-world environment from the output signals of the sensors of computing platform(s) 140, presentation device(s) 141, and/or other devices.

In some implementations, environment component 110 may be configured to determine the environmental values for the intensity of light of different areas of the physical real-world environment. Environment component 110 may be configured to determine the environmental values for the intensity of light of different areas of the physical real-world environment from the characteristics of ambient light of different areas of the physical real-world environment. In some implementations, environment component 110 may be configured to determine the environmental values for the intensity of light that lie within different portions of the field of view of the sensors of computing platform(s) 140, presentation device(s) 141, and/or other devices.

Environment component 110 may be configured to determine colors and/or color composition of the physical real-world environment. Environment component 110 may be configured to determine the colors and/or color composition the physical real-world environment that lies within the field of view of the sensors of computing platform(s) 140, presentation device(s) 141, and/or other devices. Environment component 110 may be configured to determine the colors and/or color composition of the physical real-world environment which the virtual content may be superimposed over.

Environment component 110 may be configured to determine the colors and/or color composition of the physical real-world environment from the output signals of the sensors of computing platform(s) 140, presentation device(s) 141, and/or other devices. Environment component 110 may be configured to determine the colors and/or color composition of the physical real-world environment from the characteristics of ambient light of the physical real-world environment. Environment component 110 may be configured to determine the colors and/or color composition that lie within the field of view of the sensors of computing platform(s) 140, presentation device(s) 141, and/or other devices. In some implementations, the sensors may generate output signals conveying the colors and/or color composition of the physical real-world environment.

In some implementations, environment component 110 may be configured to determine the environmental value specifying the colors and/or color composition of the physical real-world environment. Environment component 110 may be configured to determine the environmental value specifying the colors and/or color composition of the physical real-world environment from the characteristics of the color composition and/or other information. Environment component 110 may be configured to determine the environmental value specifying the colors and/or color composition of the physical real-world environment from the output signals of the sensors of computing platform(s) 140, presentation device(s) 141, and/or other devices.

In some implementations, environment component 110 may be configured to determine the environmental values for the colors and/or color composition of different areas of the physical real-world environment. Environment component 110 may be configured to determine the environmental values for the colors and/or color composition of different areas of the physical real-world environment from the characteristics of the color composition of different areas of the physical real-world environment. In some implementations, environment component 110 may be configured to determine the environmental values for the colors and/or color composition that lie within different portions of the field of view of the sensors of computing platform(s) 140, presentation device(s) 141, and/or other devices.

In some implementations, the environmental values for the color composition of the physical real-world environment may specify the composition of individual primary colors in the physical real-world environment. The environmental values for the color composition of the physical real-world environment may specify the composition of individual primary colors in the physical real-world environment that lie within the field of view of the sensors of computing platform(s) 140, presentation device(s) 141, and/or other devices. The environmental values for the color composition of the physical real-world environment may specify the composition of individual primary colors in the physical real-world environment which the virtual content may be superimposed over.

In some implementations, the environmental values for the color composition of the physical real-world environment may specify the color composition an area of the physical real-world environment. In some implementations, the environmental values for the color composition of the physical real-world environment may specify the color composition that lies within different portions of the field of view of the sensors of computing platform(s) 140, presentation device(s) 141, and/or other devices. In some implementations, the environmental values for the color composition of the physical real-world environment may specify the color composition an area of the physical real-world environment which virtual content may be superimposed over.

Determination component 112 may be configured to determine difference information and/or other information. Determination component 112 may be configured to determine the difference information based on the reference information, display information, and/or other information. Determination component 112 may be configured to determine the difference information based the set of expected values of the expected virtual content and the set of display values of the visual presented on computing platform(s) 140 and/or presentation device(s) 141. The difference information may specify differences between the visuals of the virtual content presented and the expected virtual content.

The difference information may define one or more difference values of the visual parameters and/or other information. The difference values of the visual parameters may specify the differences between the display values and the expected values of the individual visual parameters. Determination component 112 may be configured to determine the difference values of the visual parameters by comparing the display values to the expected values of the individual visual parameters. Determination component 112 may be configured to determine the individual difference values of the visual parameters by comparing the individual display values to the individual expected values of the individual visual parameters.

Determination component 112 may be configured compared to determine the difference values for one or more individual pixels and/or groups of pixels presenting the visual of the virtual content. The comparison of the display values and the expected values of the individual visual parameters may include a comparison between one or more individual pixels and/or groups of pixels.

Determination component 112 may be configured to determine an interference level of the physical real-world environment which the virtual content may be superimposed over. In some implementations, determination component 112 may be configured to determine the interference level of the area of the physical real-world environment which the virtual content may be superimposed over. Determination component 112 may be configured to determine the interference level based on the environmental information and/or other information. Determination component 112 may be configured to determine the interference level based on the environmental values specifying the intensity of light, colors and/or color composition, and/or other information of the physical real-world environment.

Determination component 112 may be configured to determine the interference level including a light interference level, a color interference level, and/or other interference levels. Determination component 112 may be configured to determine the light interference level based on the environmental values specifying the intensity of light of the physical real-world environment. Determination component 112 may be configured to determine the color interference level based on the environmental values specifying the colors and/or color composition of the physical real-world environment.

Interferences from the physical real-world environment may alter the perceived appearance of the virtual content. The interferences from surrounding environment may include one or more of light interferences, color interferences, and/or other interferences. For example, the visual of the virtual content may be superimposed over the perspective of the physical real-world environment, and the interferences from the physical real-world environment may alter the appearance of the virtual content perceived by the user. The altered appearance of the virtual content may be different compared to the expected virtual content. The Interference levels may specify the amount of Interferences from the physical real-world environment.

The light interferences may be caused by the high light intensity and/or low light intensity of the physical real-world environment which the virtual content may be superimposed over. For example, the overly bright light intensity of the physical real-world environment may saturate and/or alter the visuals (such as the color) of the virtual content superimposed over the perspective of the physical real-world environment. An overly bright physical real-world environment may over saturate and/or alter the visuals (such as the color) of the virtual content superimposed over the perspective of the physical real-world environment. An overly dim light intensity of the physical real-world environment may under saturate and/or alter the visuals (such as the color) of the virtual content superimposed over the perspective of the physical real-world environment.

By way of non-limiting illustration, the virtual content may be presented on a transparent display of presentation device(s) 141 and/or other devices. The transparent display of presentation device(s) 141 may enable light from the physical real-world environment to be seen by the user. The transparent display of presentation device(s) 141 effectuating presentation of the virtual content superimposed over the view of the physical real-world environment. The light from the physical real-world environment may blend with the visuals of the virtual content and be seen by the user. The blend of light of the physical real-world environment and the visual of the virtual content may alter the color of the virtual content presented. The blend of light of the physical real-world environment and the visual of the virtual content may alter the intended appearance of the virtual content.

The color interferences may be caused by the colors in the physical real-world environment which the virtual content may be superimposed over. The colors in the physical real-world environment in which the virtual content may be superimposed over the physical real-world environment may alter the color of the virtual content. For example, the color of the virtual content may blend in with the color of the physical real-world environment and alter the perceived color of virtual content.

By way of non-limiting illustration, the transparent display of presentation device(s) 141 may enable color from the physical real-world environment to be seen by the user. The transparent display of presentation device(s) 141 effectuating presentation of the virtual content superimposed over the view of the physical real-world environment. The color from the physical real-world environment may blend with the color of the virtual content and be perceived by the user. The blend of colors of the physical real-world environment and the visual of the virtual content may alter the color of the virtual content presented. The blend of the color of the physical real-world environment and the visual of the virtual content may alter the intended appearance of the virtual content.

In some implementations, the interference level may be specified by one or more values and/or other information. The one or more values of the interference level may specify the amount of interference caused by the surrounding environment of the physical real-world environment. Determination component 112 may be configured to determine the value for the interference level based on the environmental values and/or other information. In some implementations, the value for the interference level may be proportional to the environmental value. In some implementations, the value for the interference level may be a ratio of the environmental value. In some implementations, the value for the interference level may increase and/or decrease when the environmental values exceed a threshold. The threshold may be predetermined.

Determination component 112 may be configured to determine a value for the light interference level based on the environmental values and/or other information. In some implementations, the value for the light interference level may be proportional to the environmental value specifying the intensity of light of the physical real-world environment. In some implementations, the value for the light interference level may be a ratio of the environmental value specifying the intensity of light of the physical real-world environment. In some implementations, the value for the light interference level may increase and/or decrease when the environmental values specifying the intensity of light of the physical real-world environment exceeds a threshold. The threshold may be predetermined.

Determination component 112 may be configured to determine a value for the color interference level based on the environmental values and/or other information. In some implementations, the value for the color interference level may be proportional to the environmental value specifying the colors and/or color composition of the physical real-world environment. In some implementations, the value for the color interference level may be a ratio of the environmental value specifying the colors and/or color composition of the physical real-world environment. In some implementations, the value for the color interference level may increase and/or decrease when the environmental values specifying the colors and/or color composition of the physical real-world environment exceeds a threshold. The threshold may be predetermined.

In some implementations, determination component 112 may be configured to determine the difference information and the interference levels contemptuously in time and/or at different times.

Modification component 114 may be configured to determine modification information and/or other information. Modification component 114 may be configured to determine modification information based on the difference information, environmental information, interferences level, and/or other information. Modification component 114 may be configured to obtain the content information and/or other information. Modification component 114 may be configured modify and/or generate instructions to modify the virtual content defined by the content information. The modification information may specify modifications to the visual of the virtual content presented on presentation device(s) 141 and/or other devices. The modification information may specify modifications to the visual of the virtual content presented on presentation device(s) 141 such that the visual presented on presentation device(s) 141 may appear as the expected virtual content.

The modification information may specify modifications to the visual of the virtual content presented on presentation device(s) 141 such that the differences between the display values and the expected value may be minimized and/or the same. The differences between the display values and the expected value may be minimized and/or the same by increasing or decreasing the display values. The display values may be increased and/or decreased when the visual of the virtual content presented on presentation device(s) 141 may be altered/modified. The visual of the virtual content presented on presentation device(s) 141 may be altered/modified by increasing and decreasing the brightness and/or contrast of the visuals of the virtual content, changing and/or altering the color of the visuals of the virtual content, and/or other modifications.

The modification of the visual of the virtual content presented on presentation device(s) 141 may alter/modify the display values of the visual parameters of the virtual content presented on presentation device(s) 141. The visual presented on presentation device(s) 141 may be modified such that the differences between display values of the visual parameters of the virtual content presented and the expected values of the visual parameters of the intended appearance of the virtual content may be minimized and/or the same. The modification information may specify modifications to the visual of the virtual content presented on presentation device(s) 141 such that the display values may be within the range of the expected value. The modifications to the visual of the virtual content may include modifying one or more of a light intensity, color, contrast, resolution, and/or other features of the visuals presented by presentation device(s) 141.

Modification component 114 may be configured to determine the modification information to modify the visual of the virtual content presented on presentation device(s) 141 such that the interferences perceived by the user may be minimized and/or negated. Modification component 114 may be configured to determine the modification information to modify the visual of the virtual content presented on presentation device(s) 141 such that the one or more of the light interferences, the color interferences, and/or other interferences perceived by the user may be minimized and/or negated. Modification component 114 may be configured to determine the modification information based on the interference level.

The modification information may specify modifications to the visual of the virtual content presented on presentation device(s) 141 such that the interferences from the physical real-world environment may be minimized and/or negated. The modification information may specify modifications to the display values of the virtual content presented on presentation device(s) 141 such that the interferences from the physical real-world environment may be minimized and/or negated. In some implementations, the modifications to the visual of the virtual content presented on presentation device(s) 141 may alter/modify the display values of the virtual content presented on presentation device(s) 141. The display values may be increased or decreased to minimize and/or negate the interferences from the physical real-world environment. In some implementations, the display values may be set of a preset value to minimize and/or negate the interferences from the physical real-world environment. For example, the display values for the brightness parameter and/or contrast parameter may be increased, decreased, and/or set to the present values to minimize and/or negate the light interference. The display value for the color parameter may be increased, decreased, and/or set to the present values to minimize and/or negate the color interference.

The amount of the display values increased and/or decreased may be based on the interference level. The amount of the display values may be increased and/or decreased such that the interference level may be minimized. In some implementations, the display values may be set to the present values based on the interference level. By way of non-limiting illustration, the display values may be set to first present values when a first interference level may be identified, second present values when a second interference level may be identified, and/or other present values when other interference levels may be identified. The association between the interference levels and the present values may be determined by the creator of the virtual content and/or the user. The present values may be determined by the creator of the virtual content and/or the user. In some implementations, the modification information may specify modifications to the visual of the virtual content presented on presentation device(s) 141 when the interference levels exceed a predetermined threshold. In some implementations, the modification information may specify modifications to the visual of the virtual content presented on presentation device(s) 141 when the given environmental characteristic may be detected. For example, the modification information may specify modifications to the visual of the virtual content presented on presentation device(s) 141 when the brightness of the physical real-world environment exceeds a predetermined threshold, or when a given color may be detected in the physical real-world environment.

In some implementations, responsive to the light interference level exceeding a predetermined value modification information may specify modifications to the display values of the brightness parameter and/or contrast parameter such that such that the brightness and/or color the virtual content appears as the expected virtual content. In some implementations, responsive to the color interference level exceeding a predetermined value, the modification information may specify modifications to the display values of the color parameter, such that the color the virtual content appears as the expected virtual content.

In some implementations, the modifications to the display values of the virtual content may include modifying modification to the area of the physical real-world environment with the interference level. For example, the visual of the virtual content superimposed over the perspective of the area of the physical real-world environment with the interference level may be modified. In some implementations, only the visual of the virtual content superimposed over the perspective of the area of the physical real-world environment with the interference level may be modified.

In some implementations, modification component 114 may be configured determine the modification information for modifying the visual of the virtual content presented on presentation device(s) 141 such that the differences between the display values and the expected value may be minimized and/or the same, and modifying the visual of the virtual content presented on presentation device(s) 141 such that the interference level is minimized contemptuously in time and/or at different times. For example, modification component 114 may be configured determine the modification information for modifying the visual of the virtual content presented on presentation device(s) 141 such that the differences between the display values and the expected value may be minimized and/or the same first, then the modification to the visual of the virtual content presented on presentation device(s) 141 such that the interference level is minimized second. Modification component 114 may be configured to generate the modification information to modify the visuals of the virtual content presented by presentation device(s) 141 such that the differences between the display values and the expected value may be minimized and/or the same, and the interferences from the physical real-world environment perceived by the user may be minimized and/or negated.

The modification information may specify modifications to individual pixels and/or groups of pixels of the virtual content presented on presentation device(s) 141. Modification component 114 may be configured to modify individual pixels and/or groups of pixels of the virtual content presented on presentation device(s) 141 based on the modification information. Modification component 114 may be configured to generate the modification information to modify the visuals of the virtual content presented by presentation device(s) 141 such that the visuals of the virtual content may be perceived by the user as the expected virtual content or close to the expected virtual content.

Presentation component 116 may be configured to facilitate presentation of the virtual content and/or other information. Presentation component 116 may be configured to obtain the content information, the modification information, and/or other information. Presentation component 114 may be configured to facilitate presentation of the virtual content on presentation device(s) 141 and/or other devices. Presentation component 114 may be configured to facilitate presentation of the virtual content on presentation device(s) 141 based on the content information, the modification information, and/or other information.

Presentation component 116 may be configured to facilitate presentation of the virtual content on presentation device(s) 141 such that the virtual content appears on presentation device(s) 141 as the expected virtual content and/or close to the expected virtual content. Presentation component 116 may be configured to facilitate presentation of the modified visuals of the virtual content. Presentation component 116 may be configured to facilitate presentation of the modified visuals of the virtual content such that the virtual content appears on presentation device(s) 141 as the expected virtual content and/or close to the expected virtual content. Presentation component 116 may be configured to cause presentation device(s) 141 to effectuate presentation of the virtual content and/or the modified virtual content to be superimposed over the perspective of the physical real-world environment.

Presentation component 116 may be configured to transmit control signals instructing presentation device(s) 141 to effectuate presentation of the virtual content, the modified virtual content, and/or other information. Presentation component 116 may be configured to transmit control signals instructing more than one presentation device(s) 141 to effectuate presentation of the virtual content, the modified virtual content, and/or other information. Presentation component 116 may be configured to transmit control signals instructing more than one presentation device(s) 141 at the same time and/or at different times.

Presentation component 116 may be configured to transmit control signals instructing computing platform(s) 140 to cause presentation device(s) 141 to effectuate presentation of the virtual content, the modified virtual content, and/or other information. Presentation component 116 may be configured to transmit control signals instructing more than one computing platform(s) 140 to cause presentation device(s) 141 to effectuate presentation of the virtual content, the modified virtual content, and/or other information. Presentation component 116 may be configured to transmit control signals instructing more than one computing platform(s) 140 at the same time and/or at different times.

In some implementations, server(s) 102, computing platform(s) 140, and/or external resource(s) 120 may be operatively linked via one or more electronic communication links. For example, such electronic communication links may be established, at least in part, via a network 103 such as the Internet and/or other networks. It will be appreciated that this is not intended to be limiting, and that the scope of this disclosure may include implementations in which server(s) 102, computing platform(s) 140, and/or external resource(s) 120 may be operatively linked via some other communication media.

In some implementations, external resource(s) 120 may include sources of information, hosts and/or providers of virtual environments outside of system 100, external entities participating with system 100, and/or other resources. In some implementations, some or all of the functionality attributed herein to external resource(s) 120 may be provided by resources included in system 100.

In some implementations, Server(s) 102 may include electronic storage(s) 122, processor(s) 124, and/or other components. Server(s) 102 may include communication lines or ports to enable the exchange of information with a network and/or other computing devices. Illustration of server(s) 102 in FIG. 1A, FIG. 1B, FIG. 1C, and FIG. 1D is not intended to be limiting. Server(s) 102 may include a plurality of hardware, software, and/or firmware components operating together to provide the functionality attributed herein to server(s) 102. For example, server(s) 102 may be implemented by a cloud of computing devices operating together as server(s) 102.

In some implementations, electronic storage(s) 122 may include electronic storage media that electronically stores information. The electronic storage media of electronic storage(s) 122 may include one or both of system storage that is provided integrally (i.e., substantially nonremovable) with server(s) 102 and/or removable storage that is removably connectable to server(s) 102 via, for example, a port (e.g., a USB port, a firewire port, etc.) or a drive (e.g., a disk drive, etc.). Electronic storage(s) 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage(s) 122 may include one or more virtual storage resources (e.g., cloud storage, a virtual private network, and/or other virtual storage resources). Electronic storage(s) 122 may store software algorithms, information determined by processor(s) 124, information received from server(s) 102, information received from computing platform(s) 140, and/or other information that enables server(s) 102 to function as described herein.

In some implementations, processor(s) 124 may be configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1A, FIG. 1B, FIG. 1C, and FIG. 1D as a single entity, this is for illustrative purposes only. In some implementations, processor(s) 124 may include a plurality of processing units. These processing units may be physically located within the same computing platform, or processor(s) 124 may represent processing functionality of a plurality of devices operating in coordination. The processor(s) 124 may be configured to execute computer-readable instruction components 106, 108, 110, 112, 114, 116, and/or other components. The processor(s) 124 may be configured to execute components 106, 108, 110, 112, 114, 116, and/or other components by software; hardware; firmware; some combination of software, hardware, and/or firmware; and/or other mechanisms for configuring processing capabilities on processor(s) 124.

It should be appreciated that although components 106, 108, 110, 112, 114, and 116 are illustrated in FIG. 1A, FIG. 1B, FIG. 1C, and FIG. 1D as being co-located within a single processing unit, in implementations in which processor(s) 124 may include multiple processing units, one or more of components 106, 108, 110, 112, 114, and/or 116 may be located remotely from the other components. The description of the functionality provided by the different components 106, 108, 110, 112, 114, and/or 116 described herein is for illustrative purposes, and is not intended to be limiting, as any of components 106, 108, 110, 112, 114, and/or 116 may provide more or less functionality than is described. For example, one or more of components 106, 108, 110, 112, 114, and/or 116 may be eliminated, and some or all of its functionality may be provided by other ones of components 106, 108, 110, 112, 114, and/or 116. As another example, processor(s) 124 may be configured to execute one or more additional components that may perform some or all of the functionality attributed herein to one of components 106, 108, 110, 112, 114, and/or 116.

Although components 106, 108, 110, 112, 114, and 116 are illustrated in FIG. 1D is located in server(s) 102, in some implementations, components 106, 108, 110, 112, 114, and 116 can be implemented other components such as computing platform(s) 140 and perform the same functionally as server(s) 102. For example, components 106, 108, 110, 112, 114, and 116 can be implemented in presentation device(s) 141 (as seen in FIGS. 1B, and 1C). In some implementations, components 106, 108, 110, 112, 114, and 116 can be implemented in other physical processors and/or other components (as seen in FIGS. 1B, and 1C).

Figure 2:
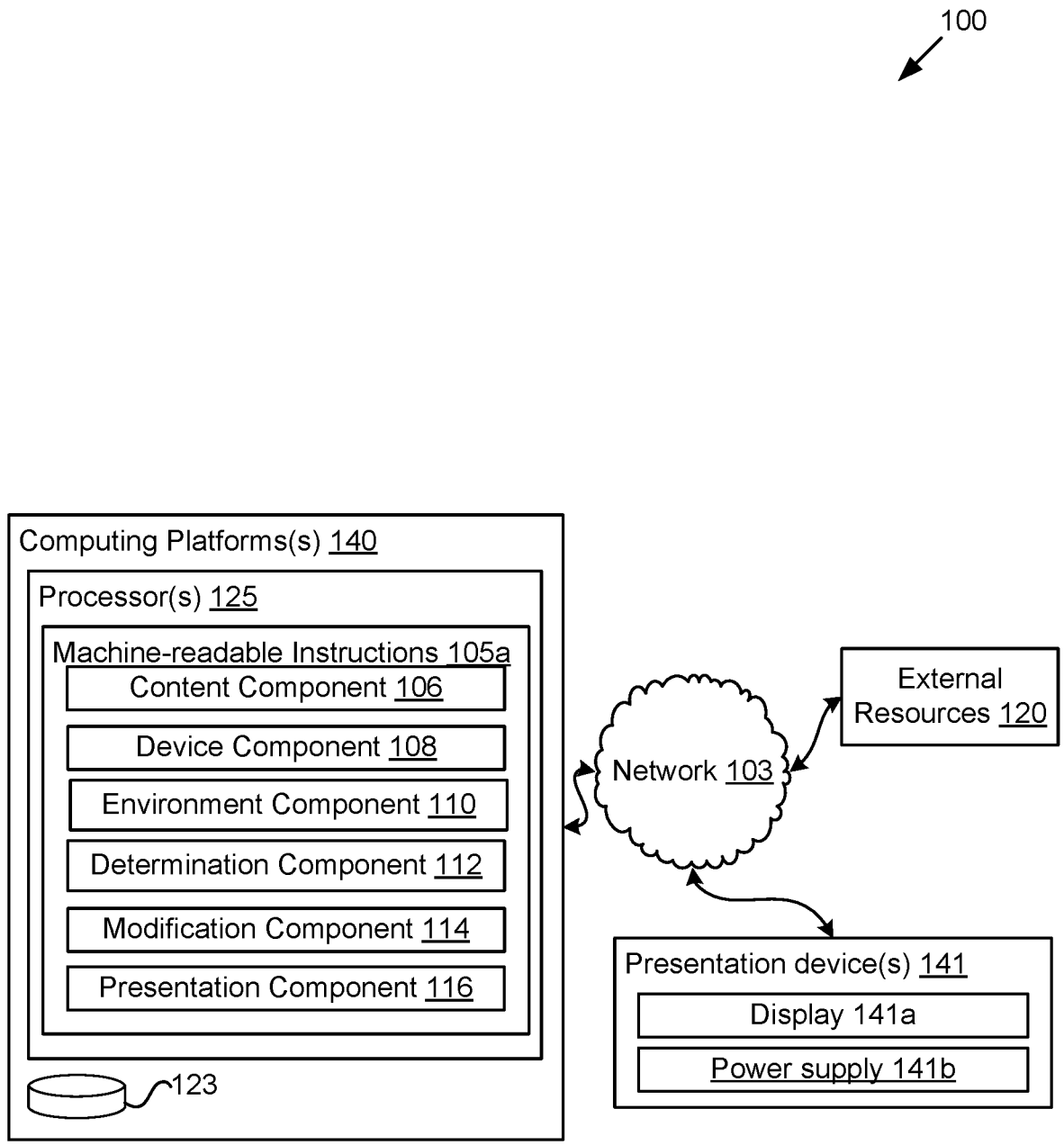
FIG. 2 illustrates the system with a presentation device and computing platform for facilitating providing an interactive space with an intended appearance on a presentation device and computing platform, in accordance with one or more implementations.

As illustrated in FIG. 2, in some implementations, system 100 may include computing platform(s) 140, presentation device(s) 141, one or more external resources 120, and/or other components. Computing platform(s) 140 may include one electronic storages 123, physical processor(s) 125, and/or other components. Physical processor(s) 125 may be configured by machine-readable instructions 105a. Machine-readable instructions 105a may include one or more computer program components. The one or more computer program components may include components 106, 108, 110, 112, 114, and 116. Executing machine-readable instructions 105a may cause one or more physical processor(s) 125 to facilitate providing the interactive space with the intended appearance.

Figure 3:
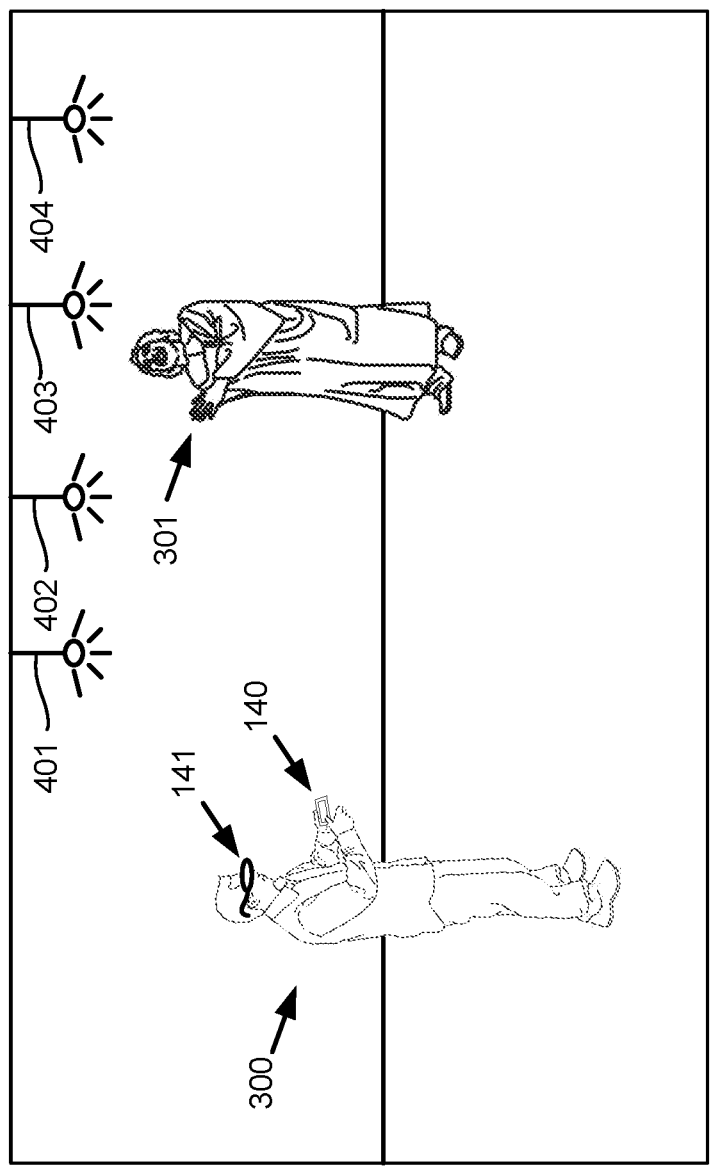
FIG. 3 illustrates a view of a user using a presentation device to view virtual content that may be superimposed over the perspective of the physical real-world environment, in accordance with one or more implementations.

FIG. 3 illustrates a view of a user 300 the physical real-world environment. The physical real-world environment may include another person 301, one or more lightings, and/or other objects in the physical real-world environment. The one or more lightings may include a first lighting 401, a second lighting 402, a third lighting 403, a fourth lighting 404, and/or other lightings. The one or more lightings may be a lamp and/or other lighting systems. The one or more lightings may effectuate one or more frequency of light and/or colors around the surrounding of the physical real-world environment. The one or more lighting may represent ambient light in the physical real-world environment and/or other environmental characteristics of the physical real-world environment. User 300 may communicate with system 100, presentation device(s) 141, and/or other systems via computing platform(s) 140. User 300 may view the visuals of the virtual content via presentation device(s) 141. Presentation device(s) 141 may be a head-mounted display mounted on the head of user 300 and/or other devices. The visuals of the virtual content may be superimposed over the perspective of the physical real-world environment. Although, FIG. 3 illustrates user 300 holding computing platform(s) 140, in some implementations computing platform(s) 140 may be coupled to presentation device(s) 141.

Figure 4:
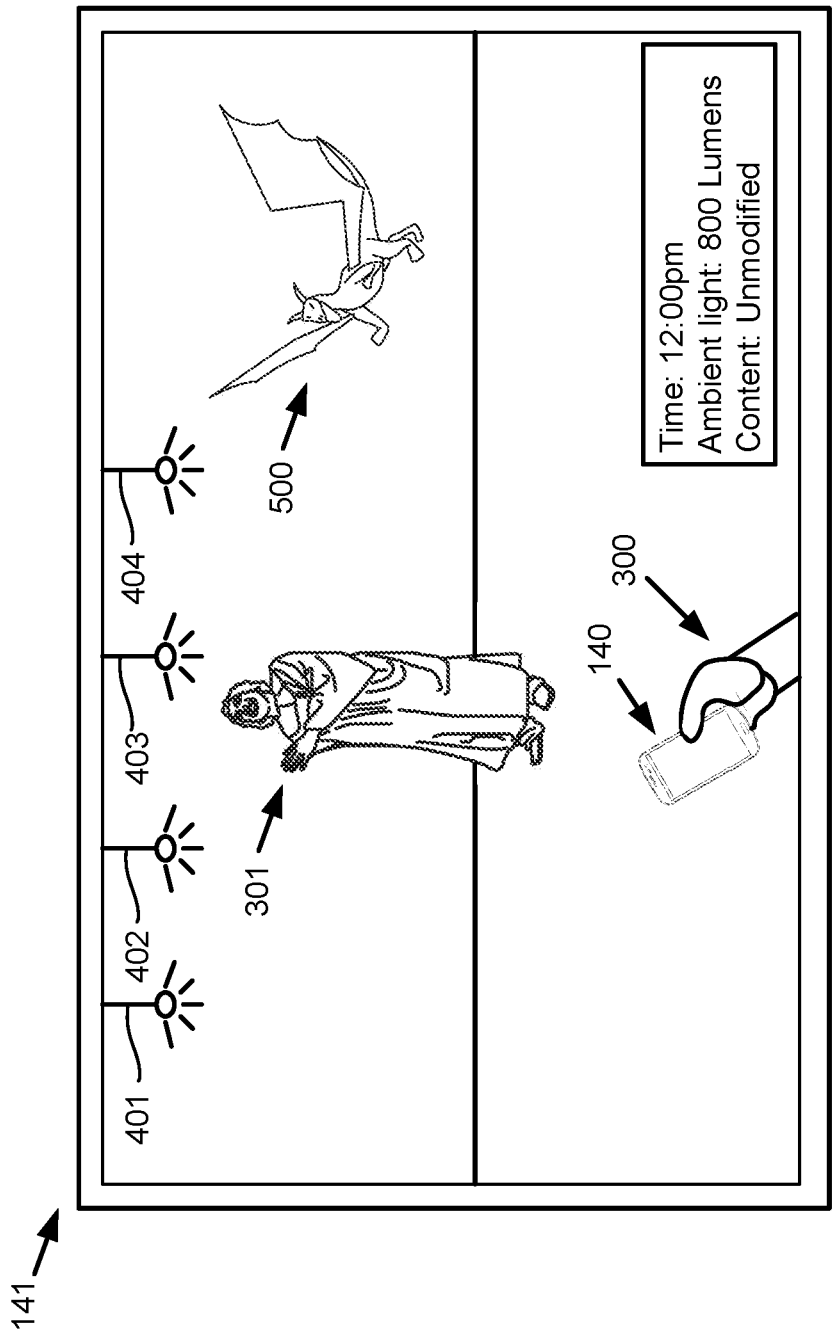
FIG. 4 illustrates a view of the virtual content superimposed over the perspective of the physical real-world environment from the point of view of the user, the virtual content may have an unintended appearance of the virtual content caused by features in the physical real-world environment, in accordance with one or more implementations.

FIG. 4 illustrates a view of the virtual content superimposed over the perspective of the physical real-world environment from the point of view of user 300. The virtual content may include a first virtual entity 500 with a first appearance. The first appearance of first virtual entity 500 may not appear as the expected visuals of the virtual content. The first appearance of first virtual entity 500 may be altered by the surroundings of the physical real-world environment. For example, the first appearance of first virtual entity 500 may be altered by the one or more lightings.

Figure 5:
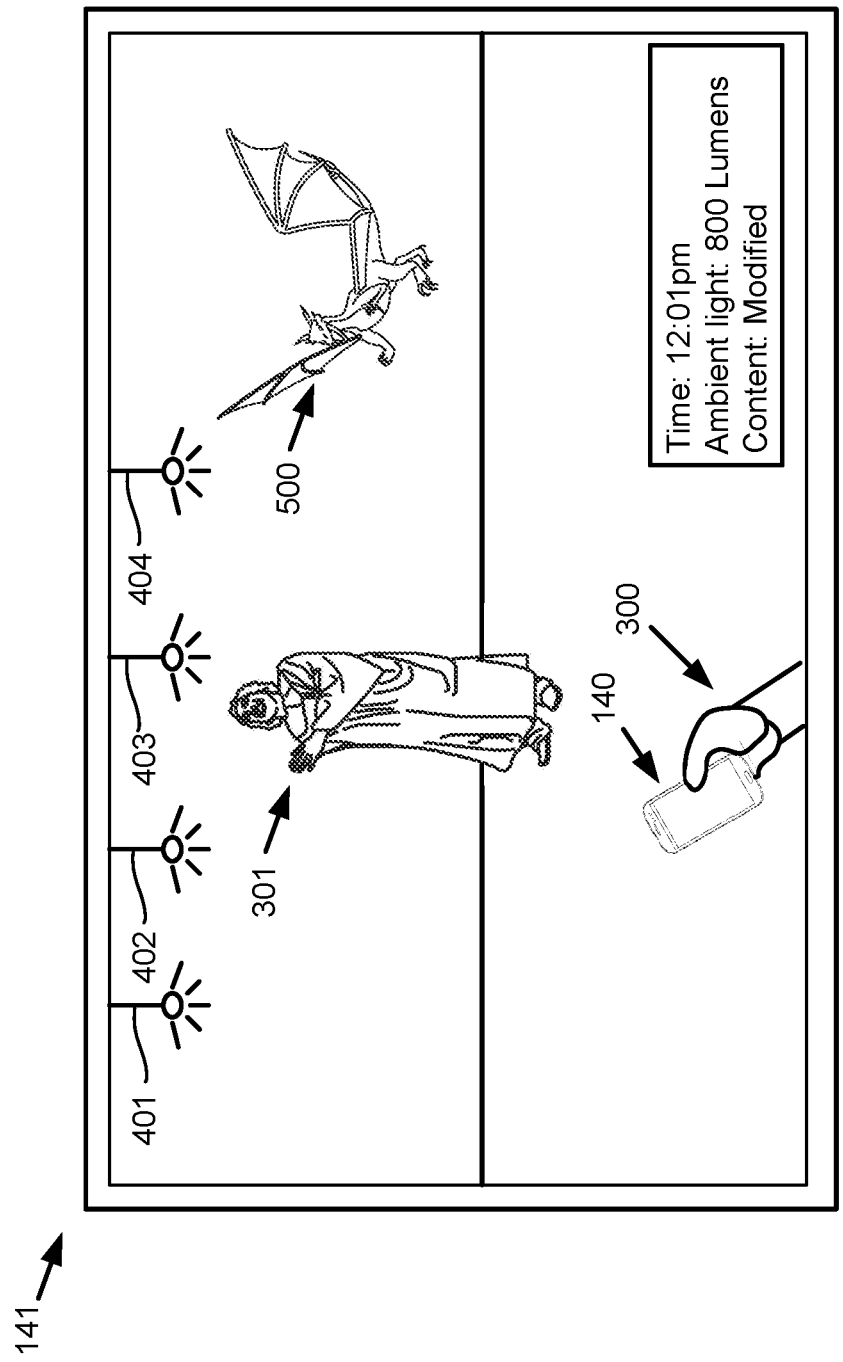
FIG. 5 illustrates a view of the modified virtual content superimposed over the perspective of the physical real-world environment from the point of view of the user, the modified virtual content may be modified to have an intended appearance of the virtual content, in accordance with one or more implementations.

FIG. 5 illustrates a view of the modified the visuals of virtual content superimposed over the perspective of the physical real-world environment from the point of view of user 300. The visual of the first virtual entity 500a may be altered based on the surroundings of the physical real-world environment. The visual of the first virtual entity 500a may be altered based on the intensity of the ambient light created by the one or more lightings in the physical real-world environment and/or other features of the physical real-world environment. The visual of the first virtual entity 500a may be altered such that the first virtual entity 500 may appear at the expected visuals of the virtual content. The brightness, color, contrast, and/or other graphical features of the visuals of virtual content may be modified such that the visuals of virtual content presented by presentation device(s) 141 may appear as the expected visuals of the virtual content.

Figure 6:
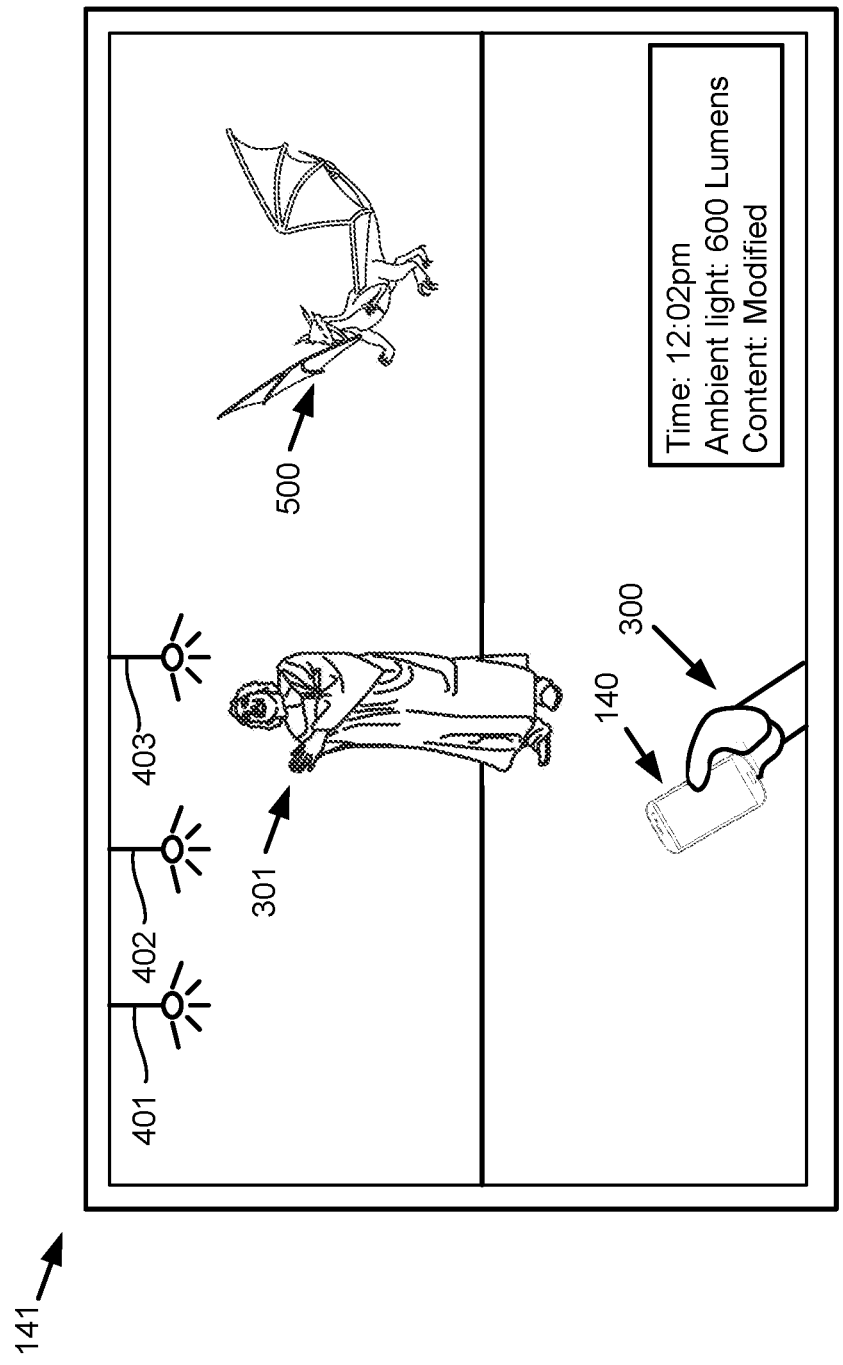
FIG. 6 illustrates a view of a change in the physical real-world environment and the view of the modified virtual content superimposed over the perspective of the physical real-world environment from the point of view of the user, in accordance with one or more implementations.

FIG. 6 illustrates a view of a change in the physical real-world environment. The intensity of the ambient light may change in the physical real-world environment. The visual of the first virtual entity 500a may be further altered when there may be a change in the physical real-world environment. The visual of the first virtual entity 500a may be further altered based on the changing intensity of the ambient light of the physical real-world environment. For example, when fourth lighting 404 is switch off in the physical real-world environment the intensity of the ambient light of the physical real-world environment may change, and the visual of the first virtual entity 500a may be further altered such that the visuals of virtual content presented by presentation device(s) 141 may appear as the expected visuals of the virtual content. As a result, the visuals of virtual content presented by presentation device(s) 141 appears the as the expected visuals of the virtual content even when there is a change in the physical real-world environment.

Figure 7:
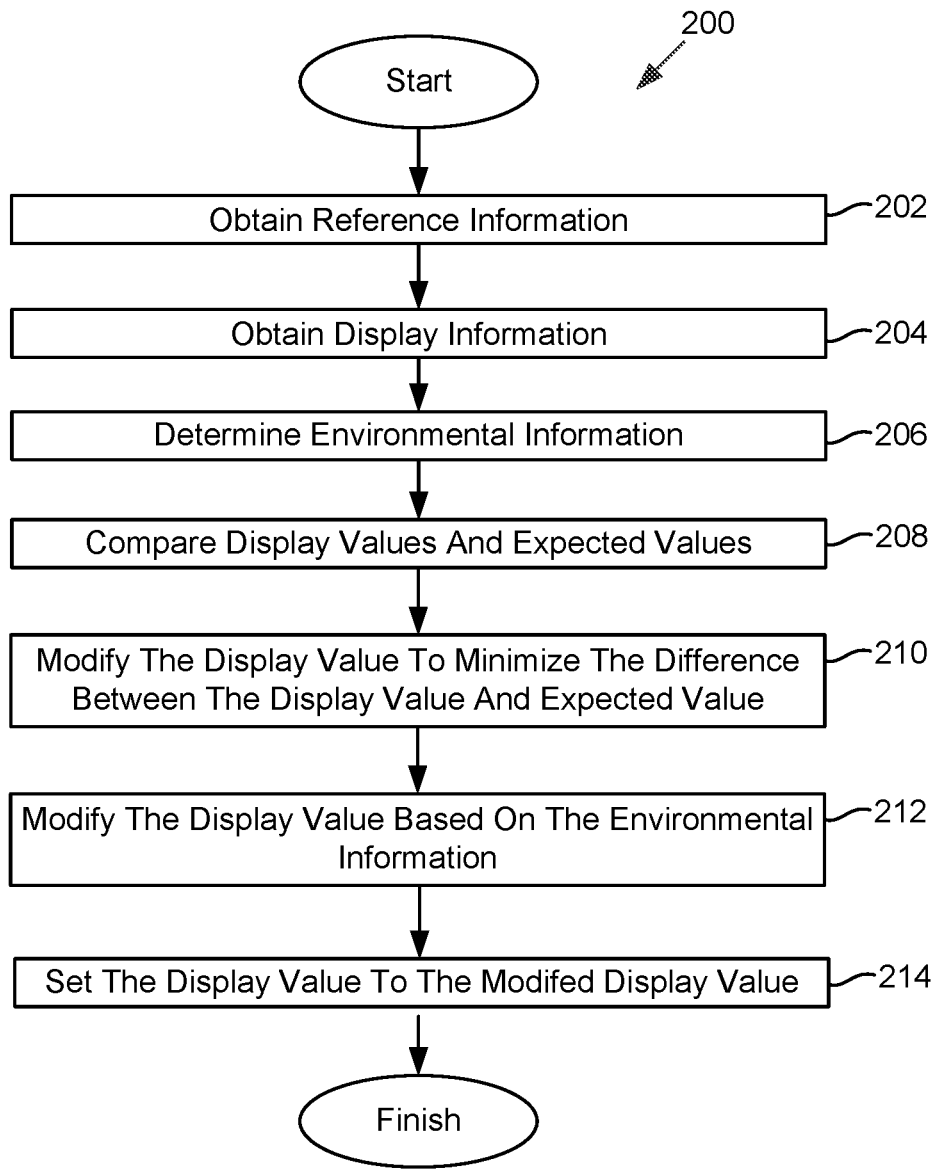
FIG. 7 illustrates a method for facilitating providing an interactive space with an intended appearance, in accordance with one or more implementations.

FIG. 7 illustrates the method 200, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 7 and described below are not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

Method 200 may be configured to dynamically adjust graphical features on a display of a client device. The client device may comprise the display, an environment sensor, and/or other components. The display being may be configured to effectuate presentation of virtual content. The environment sensor may be configured to generate output signals conveying environment information. The environment information may include characteristics of ambient light within a surrounding environment of the client device.

At an operation 202, reference information may be obtained. The reference information may define a set of expected values of the visual parameters of virtual content. The visual parameters may include a brightness parameter, a contrast parameter, a color parameter, and/or other parameters. In some embodiments, operation 202 is performed by a content component the same as or similar to content component 106 (shown in FIG. 1D and described herein).

At an operation 204, display information may be obtained. The display information may define display values of the visual parameters of the virtual content according to characteristics of the display of the client device. In some embodiments, operation 204 is performed by a device component the same as or similar to device component 108 (shown in FIG. 1D and described herein).

At an operation 206, environment information may be determined. The environment information may be determined from the output signals. In some embodiments, operation 206 is performed by an environment component the same as or similar to environment component 110 (shown in FIG. 1D and described herein).

At an operation 208, the display values and the expected values of individual ones of the visual parameters may be compared. The comparison may determine differences between the display values and the expected values. In some embodiments, operation 208 is performed by a determination component the same as or similar to determination component 112 (shown in FIG. 1D and described herein).

At an operation 210, the display values may be modified. The display values may be modified based on the comparison. The display values may be modified to minimize the differences between the display values and the expected values. In some embodiments, operation 210 is performed by a modification component the same as or similar to modification component 114 (shown in FIG. 1D and described herein).

At an operation 212, the display values may be modified. The display values may be modified based on the environment information. In some embodiments, operation 212 is performed by the modification component the same as or similar to modification component 114 (shown in FIG. 1D and described herein).

At an operation 214, the display values may be set. The display values may be set as the further modified display values. In some embodiments, operation 214 is performed by the modification component the same as or similar to modification component 114 (shown in FIG. 1D and described herein).

Although the system(s) and/or method(s) of this disclosure have been described in detail for the purpose of illustration based on what is currently considered to be the most practical and/or preferred implementations, it is to be understood that such detail is solely for that purpose and/or that the disclosure is not limited to the disclosed implementations, but, on the contrary, is intended to cover modifications and/or equivalent arrangements that are within the spirit and/or scope of the appended claims. For example, it is to be understood that the present disclosure contemplates that, to the extent possible, one or more features of any implementation can be combined with one or more features of any other implementation.

What is claimed:

1. A system configured to dynamically adjust graphical features on a display of a client device, the system comprising:

the client device comprising the display and an environment sensor, the display having one or more light sources, the display being configured to effectuate presentation of visual content, the visual content including augmented reality content, and the environment sensor being configured to generate output signals conveying environment information, the environment information including characteristics of ambient light within a surrounding environment of the client device;

one or more physical processors configured by machine-readable instructions to:

obtain reference information, the reference information defining expected values of visual parameters of the visual content according to an expected appearance of the visual content, the visual parameters including a brightness parameter, a contrast parameter, and a color parameter;

obtain display information, the display information defining display values of the visual parameters of the visual content according to characteristics of the one or more light sources of the display of the client device, wherein the characteristics of the one or more light sources of the display cause the visual content to appear on the display differently from the expected appearance;

determine the environment information from the output signals;

compare the display values of individual ones of the visual parameters with the expected values of the individual ones of the visual parameters, wherein the comparison determines differences between the display values and the expected values;

modify the display values based on the comparison to generate modified display values, wherein the display values are modified to minimize the differences between the display values and the expected values;

further modify the modified display values based on the environment information to generate further modified display values; and cause the display of the client device to effectuate presentation of the visual content based on the further modified display values.

2. The system of claim 1, wherein the expected values of the visual parameters and the display values of the visual parameters are specified for individual pixels or a group of pixels.

3. The system of claim 1, wherein the color parameter includes values defining the composition of colors.

4. The system of claim 1, wherein the comparison of the display values of the individual ones of the visual parameters with the expected values of the individual ones of the visual parameters include a comparison between individual pixels or groups of pixels.

5. The system of claim 1, wherein the characteristics of ambient light within the surrounding environment of the client device are defined by an ambient brightness parameter and an ambient color parameter.

6. The system of claim 1, further comprising non-transitory electronic storage storing ambient modification information, the ambient modification information including associations between the characteristics of ambient light and modifications of the display values based on the environment information, wherein a first characteristic of ambient light is associated with a first modification of the display values, and a second characteristic of ambient light is associated with a second modification of the display values.

7. The system of claim 6, wherein responsive to the environment information defining the first characteristic of ambient light, the one or more physical processors are further configured by the machine-readable instructions to further modify the modified display values based on the first modification.

8. The system of claim 1, wherein the modification of the display values includes modification of values of the visual parameters of the visual content of the display of the client device.

9. The system of claim 1, wherein the modification of the display values includes the modification of the display values of the visual parameters of the visual content of an entirety of the display of the client device or a portion of the display of the client device.

10. The system of claim 1, wherein the client device is a head-mounted computing device, or a handheld computing device.

11. A method configured to dynamically adjust graphical features on a display of a client device, the client device further comprising an environment sensor, the display of the client device having one or more light sources, the client device being configured to effectuate presentation of visual content, the visual content including augmented reality content, and the environment sensor being configured to generate output signals conveying environment information, the environment information including characteristics of ambient light within a surrounding environment of the client device, the method comprising:
obtaining reference information, the reference information defining expected values of visual parameters of the visual content according to an expected appearance of the visual content, the visual parameters including a brightness parameter, a contrast parameter, and a color parameter;
obtaining display information, the display information defining display values of the visual parameters of the visual content according to characteristics of the one or more light sources of the display of the client device, wherein the characteristics of the one or more light sources of the display cause the visual content to appear on the display differently from the expected appearance;
determining the environment information from the output signals;
comparing the display values of individual ones of the visual parameters with the expected values of the individual ones of the visual parameters, wherein the comparison determines differences between the display values and the expected values;
modifying the display values based on the comparison to generate modified display values, wherein the display values are modified to minimize the differences between the display values and the expected values;
further modifying the modified display values based on the environment information to generate further modified display values; and
causing the display of the client device to effectuate presentation of the visual content based on the further modified display values.

12. The method of claim 11, wherein the expected values of the visual parameters and the display values of the visual parameters are specified for individual pixels or a group of pixels.

13. The method of claim 11, wherein the color parameter includes values defining the composition of colors.

14. The method of claim 11, wherein the comparison of the display values of the individual ones of the visual parameters with the expected values of the individual ones of the visual parameters include a comparison between individual pixels or groups of pixels.

15. The method of claim 11, wherein the characteristics of ambient light within the surrounding environment of the client device are defined by an ambient brightness parameter and an ambient color parameter.

16. The method of claim 11, further comprising non-transitory electronic storage storing ambient modification information, the ambient modification information including associations between the characteristics of ambient light and modifications of the display values based on the environment information, wherein a first characteristic of ambient light is associated with a first modification of the display values, and a second characteristic of ambient light is associated with a second modification of the display values.

17. The method of claim 16, wherein responsive to the environment information defining the first characteristic of ambient light, the method further comprises further modifying the modified display values based on the first modification.

18. The method of claim 11, wherein the modification of the display values includes modification of values of the visual parameters of the visual content of the display of the client device.

19. The method of claim 11, wherein the modification of the display values includes the modification of the display values of the visual parameters of the visual content of an entirety of the display of the client device or a portion of the display of the client device.

20. The method of claim 11, wherein the client device is a head-mounted computing device, or a handheld computing device.

* * * * *